US012691691B2

(12) United States Patent
Barbarino et al.

(10) Patent No.: US 12,691,691 B2
(45) Date of Patent: Jul. 28, 2026

(54) SYSTEMS, DEVICES, AND METHODS FOR PRODUCT APPLICATION WITH DEVICE CORRECTION

(71) Applicant: L'Oreal, Paris (FR)

(72) Inventors: Casey Barbarino, San Anselmo, CA (US); Gregoire Charraud, Jersey City, NJ (US); Fred Orsita, Wayne, NJ (US); Maya Kelley, San Francisco, CA (US); Juwan Hong, Jersey City, NJ (US)

(73) Assignee: L'Oreal, Paris (FR)

(*) Notice: Subject to any disclaimer, the term of this patent is extended or adjusted under 35 U.S.C. 154(b) by 361 days.

(21) Appl. No.: 18/354,929

(22) Filed: Jul. 19, 2023

(65) Prior Publication Data

US 2025/0024931 A1 Jan. 23, 2025

(51) Int. Cl.

| | |
|---|---|
| ***B41J 3/407*** | (2006.01) |
| ***A45D 34/04*** | (2006.01) |
| ***A45D 44/00*** | (2006.01) |

(52) U.S. Cl.

CPC ............ *B41J 3/4073* (2013.01); *A45D 34/04* (2013.01); *A45D 2044/007* (2013.01)

(58) Field of Classification Search

CPC .. B41J 3/4073; A45D 34/04; A45D 2044/007; A45D 40/00; A45D 44/005; A45D 2200/10

See application file for complete search history.

(56) References Cited

U.S. PATENT DOCUMENTS

| | | |
|---|---|---|
| 6,719,565 B1 | 4/2004 | Saita et al. |
| 6,779,686 B2 | 8/2004 | Bartholomew et al. |
| 7,054,668 B2 | 5/2006 | Endo et al. |

(Continued)

FOREIGN PATENT DOCUMENTS

| | | |
|---|---|---|
| DE | 102005020938 A1 | 11/2006 |
| EP | 3179880 B1 | 9/2020 |

(Continued)

OTHER PUBLICATIONS

International Search Report and Written Opinion for International Pat. App. No. PCT/US2024/029615 filed on May 16, 2024, mailed on Jul. 25, 2024. 15 pages.

(Continued)

*Primary Examiner* — Ricardo I Magallanes
*Assistant Examiner* — Natasha Dephenia Quinn
(74) *Attorney, Agent, or Firm* — Christensen O'Connor Johnson Kindness PLLC

(57) ABSTRACT

Devices, systems, and methods for autonomous, semi-autonomous, and assisted manual application of a cosmetic style to a portion of skin (e.g., skin, hair, eyebrow) of a subject. A cosmetic deposition device includes an applicator component with a plurality of applicator nozzles and/or a movable applicator nozzle, a position sensor, and a reservoir for compositions for the cosmetic style. The device detects its position relative to the portion of skin and automatically corrects the deposition process with selective activation of one or more applicator nozzles of the plurality of applicator nozzles or selective movement of the movable applicator nozzle. These approaches enable automatic correction of application of the composition in real time.

22 Claims, 17 Drawing Sheets

(56) References Cited

U.S. PATENT DOCUMENTS

| | | | | |
|---|---|---|---|---|
| 8,695,610 | B2 * | 4/2014 | Samain | A45D 44/005 132/200 |
| 2006/0098076 | A1 * | 5/2006 | Liang | A45D 44/005 347/129 |
| 2020/0167615 | A1 * | 5/2020 | Nunokawa | G06K 15/102 |
| 2020/0171831 | A1 * | 6/2020 | Lee | B41J 3/407 |
| 2020/0337433 | A1 | 10/2020 | Chung et al. | |

FOREIGN PATENT DOCUMENTS

| | | | |
|---|---|---|---|
| EP | 3179880 | B2 * | 9/2020 |
| WO | 2016014132 | A1 | 1/2016 |
| WO | 2020256157 | A1 | 12/2020 |

OTHER PUBLICATIONS

International Search Report and Written Opinion for FR Pat. App. 2312130 filed on Nov. 8, 2023, dated May 14, 2024. 7 pages.

* cited by examiner

SYSTEMS, DEVICES, AND METHODS FOR PRODUCT APPLICATION WITH DEVICE CORRECTION

SUMMARY

In an aspect, the disclosure provides a cosmetic deposition device for application of a cosmetic style to a portion of a biological surface of a subject, the cosmetic deposition device comprising: a cosmetic deposition assembly comprising an applicator component that is adjustable; a position sensor configured to detect a position of the applicator component relative to the portion of the biological surface; and circuitry operably connected to the cosmetic deposition assembly and the position sensor, wherein the circuitry is configured to: direct the cosmetic deposition assembly to dispense a cosmetic composition according to the cosmetic style as the applicator component traverses the portion of the biological surface; compute the position of the applicator component relative to the portion of the biological surface based on the position sensor; compute an adjustment of the applicator component based on the position of the applicator component relative to the portion of the biological surface; and direct the cosmetic deposition assembly to adjust the applicator component.

In another aspect, the disclosure provides a system for application of a cosmetic style to a portion of a biological surface of a subject, the system comprising: the cosmetic deposition device; and a smart device comprising circuitry configured to: select the cosmetic style from a plurality of cosmetic styles; display the cosmetic style on an image of the portion of the biological surface of the subject; and transmit the cosmetic style as a makeup image file to the cosmetic deposition device; wherein the circuitry of the cosmetic deposition device is communicatively coupled to the circuitry of the smart device and is further configured to: receive the makeup image file from the smart device; and direct the cosmetic deposition assembly to dispense the cosmetic composition according to the cosmetic style as the applicator component traverses the portion of the biological surface based on the makeup image file.

In another aspect, the disclosure provides a method of applying a cosmetic style with the cosmetic deposition device, the method comprising: printing the cosmetic style onto the portion of the biological surface at a location adjacent to the applicator component; and automatically correcting the printing of the cosmetic style onto the portion of the biological surface based on: a position of at least a portion of the cosmetic deposition device relative to the portion of the biological surface, and optionally, a deviation of the portion of the cosmetic deposition device relative to the portion of the biological surface.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The foregoing aspects and many of the attendant advantages of this disclosure will become more readily appreciated as the same become better understood by reference to the following detailed description, when taken in conjunction with the accompanying drawings.

DETAILED DESCRIPTION

The disclosure provides devices, systems, and methods for autonomous, semi-autonomous, and assisted manual application of a cosmetic style to a portion of skin of a subject. The disclosed approaches enable automatic correction of application of the composition in real time for more accurate placement of the cosmetic style to the portion of skin. Cosmetic deposition devices are useful alone or in combination with smart devices, such as smartphones, for planning, selection, and implementation of cosmetic styles among a plurality of cosmetic styles.

Figure 1A:
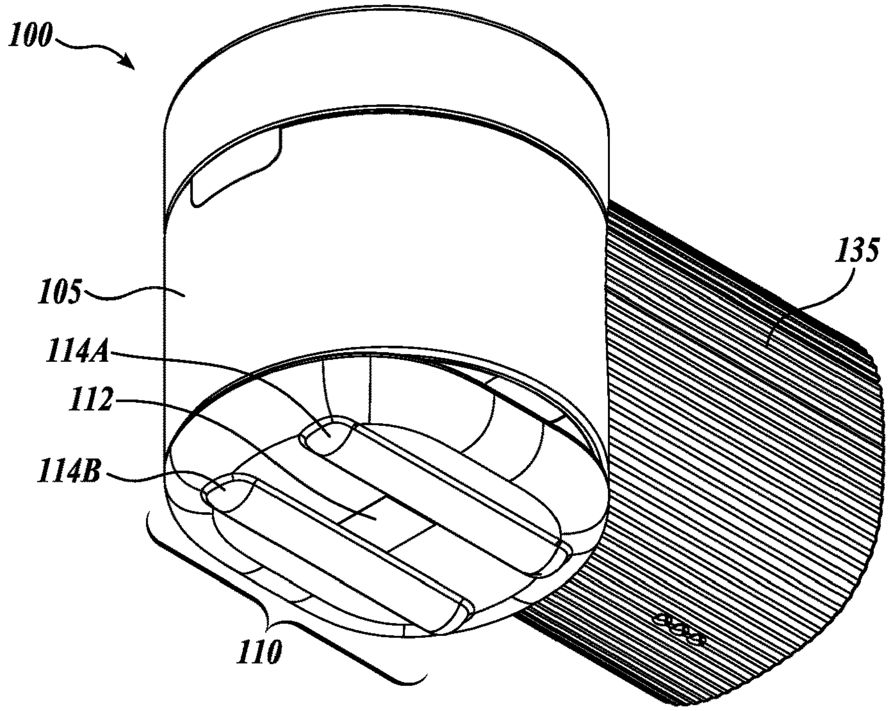
FIG. 1A shows a lower front side perspective view of an example cosmetic deposition device for application of a cosmetic style to a portion of a biological surface of a subject.
Figure 1B:
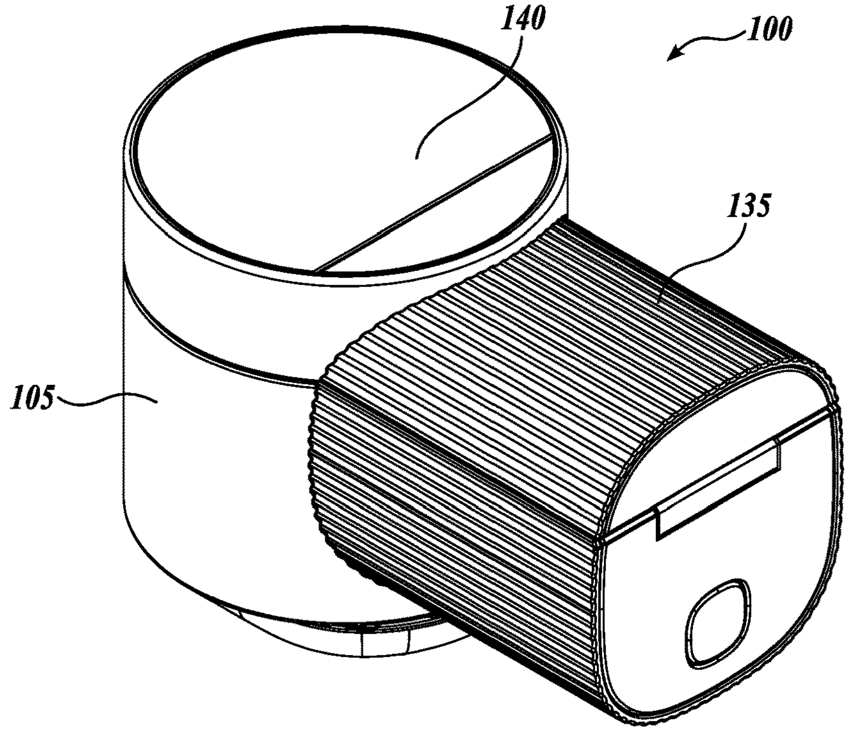
FIG. 1B shows an upper rear side perspective view of the example cosmetic deposition device.

As shown at FIG. 1A and FIG. 1B, a cosmetic deposition device 100 includes an applicator component 112, a position sensor, and a reservoir for compositions for the cosmetic style. Display 140 of cosmetic deposition device 100 can depict a user interface for a subject to control operations, features, and options of the cosmetic deposition device 100.

A cosmetic deposition device 100 is configured for application of a cosmetic style to a portion of a biological surface of a subject, and comprises a cosmetic deposition assembly 110, a position sensor, a display 140, and circuitry for carrying out all or part of an operation or method of the disclosure. The cosmetic deposition assembly 110 comprises an applicator component 112 operably connected to a reservoir (145 of FIG. 2A) comprising a cosmetic composition therein, and the position sensor can be configured to detect a position of the applicator component 112 relative to the portion of the biological surface. The applicator component 112 is adjustable and can comprise a plurality of applicator nozzles, or a movable applicator nozzle, according to embodiments and as described elsewhere herein.

Circuitry of cosmetic deposition device 100, which includes but is not limited to a processor, a microprocessor, processor circuitry, and/or dedicated hardware circuitry, operably connects the cosmetic deposition assembly 110, the position sensor, and when present in an embodiment, the display 140. The circuitry is configured to direct the cosmetic deposition assembly 110 to print the cosmetic style with passage of the dye from the reservoir through the applicator component 112 to the portion of the biological surface, compute the position of the applicator component 112 relative to the portion of the biological surface based on the position sensor, compute the selective activation of one or more nozzles of the plurality of applicator nozzles or the selective movement of the movable applicator nozzle based on the position of the applicator component relative to the portion of the biological surface, and direct the cosmetic deposition assembly to selectively activate one or more nozzles of the plurality of applicator nozzles or selectively move the movable applicator nozzle. In embodiments, circuitry of cosmetic deposition device 100 is configurable with a processor and processor-executable instructions stored on a non-transitory machine-readable medium of cosmetic deposition device 100, as a non-limiting example, but other approaches for configuring circuitry of cosmetic deposition device 100 can be implemented in embodiments.

As shown at FIGS. 1A and 1B, in embodiments, cosmetic deposition device 100 includes a housing 105 and a handle 135. Cosmetic deposition device 100 is shown with a cylindrical housing 105 and a cylindrical handle 135, but can be implemented according to any number of shapes and form factors. In embodiments, cosmetic deposition device 100 does not have handle 135 as shown. In embodiments, cosmetic deposition device 100 includes internal circuitry, including a processor, a power source, such as a battery, and the like, for electronic operation of cosmetic deposition device 100.

In embodiments, cosmetic deposition device 100 includes a processor for execution of instructions stored on a non-transitory machine-readable medium, for enabling the processor to carry out all or part of a method or process of the disclosure. In embodiments, the processor is configured to receive a makeup image file, detect a position and a curvature of a portion of skin of a subject based on the position sensor, and direct cosmetic deposition assembly 110 to print a cosmetic style based on the makeup image file at a location on the portion of skin. In embodiments, the location is determined by a cosmetic style. For example, a lipstick cosmetic style can be printed on the lips of the subject, a brow makeup can be printed to the eyebrow of the subject, an eyelid shadow can be printed to the eyelid of the subject, and the like.

In embodiments, cosmetic deposition device 100 is powered through a wired connection, e.g., a wired electrical connection with a source of alternating current; however, in embodiments, cosmetic deposition device 100 is independently powered, such as with a battery or a capacitor. In embodiments, cosmetic deposition device 100 includes a charging port configured to receive electricity from a power source to recharge a battery or capacitor of the cosmetic deposition device 100.

In embodiments, housing 105 houses cosmetic deposition assembly 110. In embodiments, cosmetic deposition assembly 110 is positioned on a first side of the cosmetic deposition device 100, and display 140 is positioned on a second side of the cosmetic deposition device 100, as shown at FIGS. 1A and 1B. In embodiments, cosmetic deposition assembly 110 includes an applicator component 112 and one or more spacers 114A and 114B.

Figure 2A:
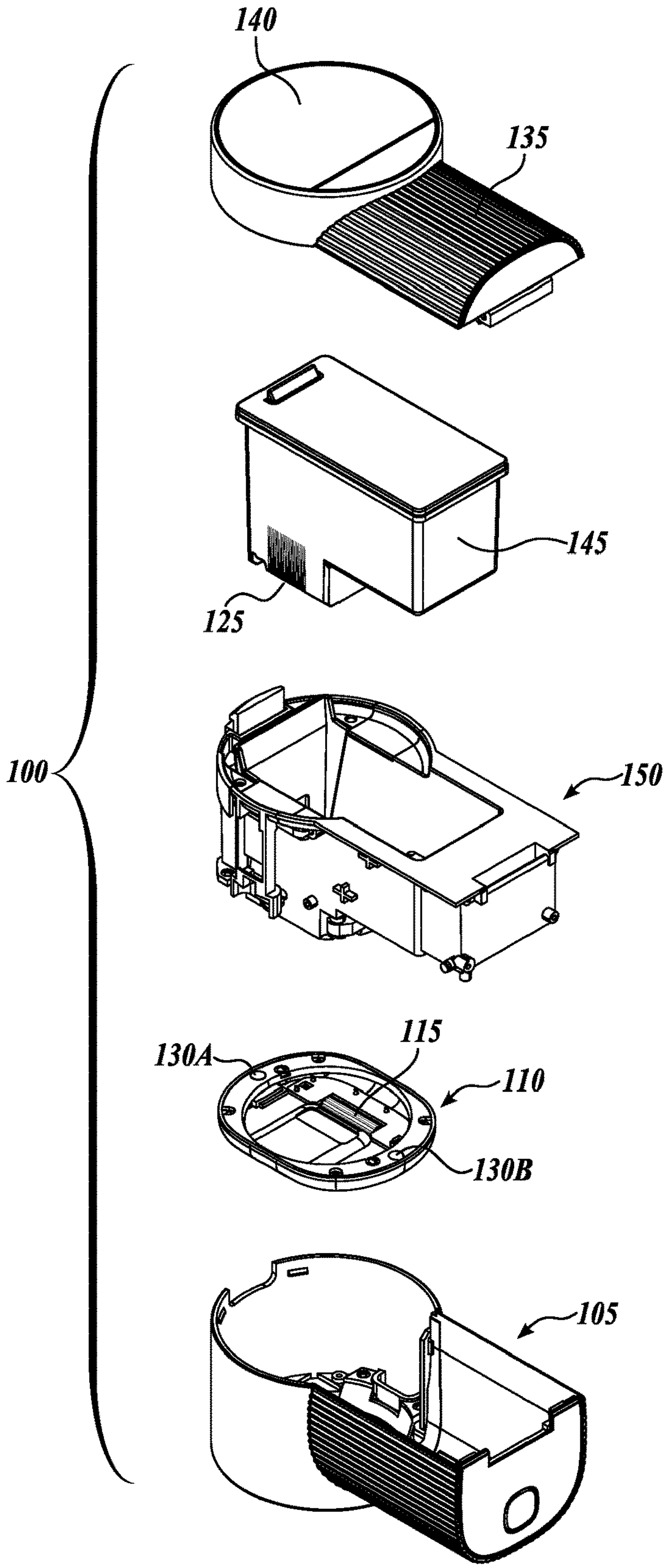
FIG. 2A shows an upper exploded view of the example cosmetic deposition device.
Figure 2B:
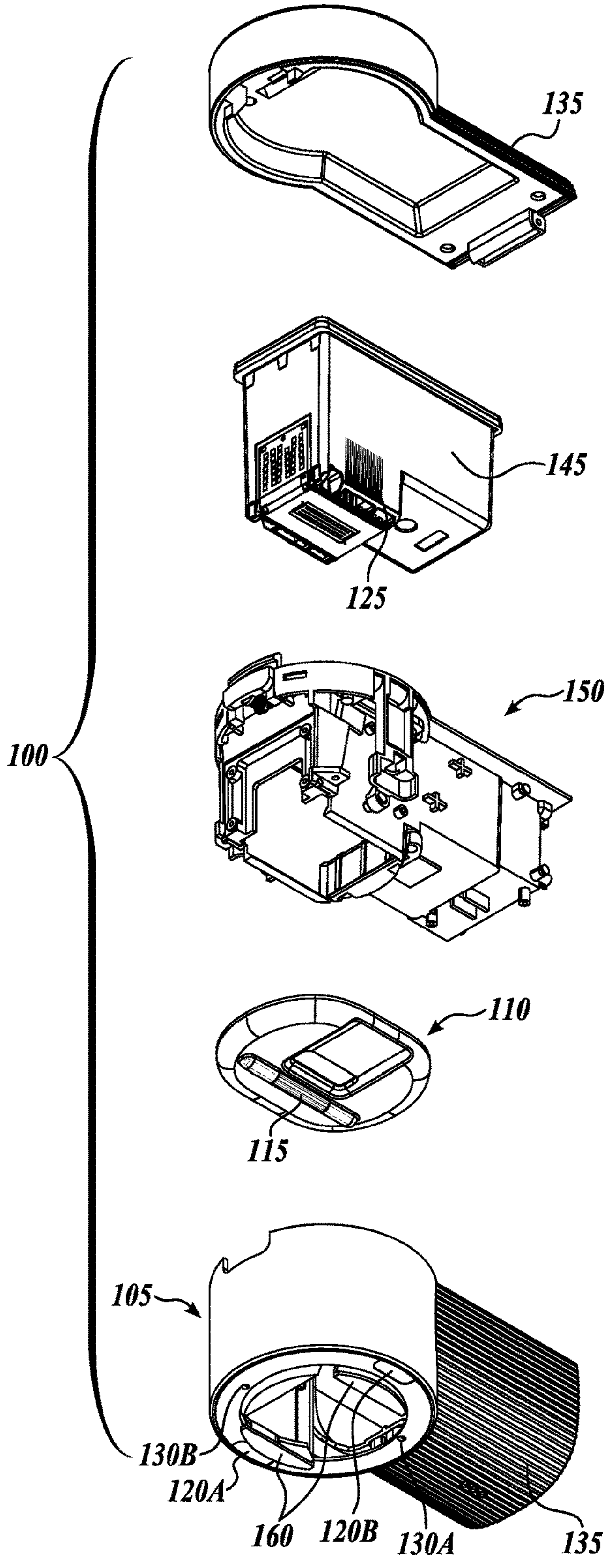
FIG. 2B shows a lower exploded view of the example cosmetic deposition device.

In embodiments, applicator component 112 is configured to facilitate cosmetic deposition assembly 110, as shown at FIG. 2B, to print a cosmetic style onto a surface. In embodiments, applicator component 112 is rectangular, square, circular, organically shaped, or the like. In embodiments, applicator component 112 is in the middle of a front side of housing 105. In embodiments, applicator component 112 is between spacers 114A, 114B.

While two spacers 114A and 114B are illustrated, it should be understood that any number and configuration of spacers 114A, 114B can be positioned on cosmetic deposition assembly 110. In embodiments, spacers 114A, 114B are rounded polygons, as shown at FIG. 1A, but it should be understood that spacers 114A, 114B can be implemented as any number of forms including spherical, rectangular, and organically shaped. In embodiments, spacers 114A, 114B are configured to contact a surface while cosmetic deposition device 100 is passed over it, such that an optimal distance between cosmetic deposition assembly 110 (or applicator component 112) and the surface is maintained. In embodiments, spacers 114A, 114B have a thickness that enables applicator component 112 to be in contact with a curved surface. In embodiments, spacers 114A, 114B are configured to roll. In embodiments, spacers 114A, 114B include at least one position sensor, as described herein. In embodiments, in addition to maintaining a distance between applicator component 112 and the surface, spacers 114A, 114B are configured to roll on the surface as cosmetic deposition device 100 prints the cosmetic style to the surface.

In embodiments, cosmetic deposition device 100 includes a position sensor operably coupled to cosmetic deposition assembly 110, as shown at FIG. 2A. In embodiments, position sensor is housed inside housing 105, but in at least some embodiments, position sensor is located on the front side of cosmetic deposition device 100 with applicator component 112. In embodiments, the position sensor is positioned inside one or both spacers 114A, 114B. In embodiments, cosmetic deposition device 100 further includes a camera, as shown at FIG. 2A. In embodiments, the camera is configured to capture a plurality of images as cosmetic deposition assembly 110 moves over a portion of skin, such as a facial feature of a subject. In embodiments, the facial feature is an eyebrow, an eyelid, a nose, an eye, a wrinkle, acne, or the like.

In embodiments, cosmetic deposition assembly 110 is a rotatably adjustable body cosmetic deposition assembly 110. In embodiments, cosmetic deposition assembly 110 is configured to articulate to scan a surface more accurately, such as a body, skin, or hair. In such embodiments, position sensor 115 can be a sensor wheel as described herein. In operation, position sensor 115 contacts the surface and rolls as the cosmetic deposition assembly 110 scans the surface. In such embodiments, cosmetic deposition device 100 is able to consider the curvature of the surface, which can be a portion of a human body. In embodiments, cosmetic deposition assembly 110 is adjustable to fit the needs of different body types and printing environments. In embodiments, cosmetic deposition assembly 110 has an applicator component 112 that is adjustable. In embodiments, spacers 114A, 114B are movable or adjustable to change the size of applicator component 112. In embodiments, applicator component 112 is concave or convex to better contact the surface. In embodiments, cosmetic deposition assembly 110 configured for being articulated, so as to better contact the surface. In embodiments, cosmetic deposition assembly 110 is coupled to cosmetic deposition device 100 with a flexible connector, as shown at FIG. 2B. In embodiments, the flexible connector is a pivot, a hinge, or a joint. In embodiments, the flexible connector allows cosmetic deposition assembly 110 to be articulated. In embodiments, this allows for more accurate scans of a surface. In embodiments, this further allows the cosmetic deposition assembly 110 to determine a curvature of a surface.

In embodiments, cosmetic deposition device 100 includes a display 140, configured for use as a user interface. Though display 140 is shown on the back side of cosmetic deposition device 100, in embodiments, display 140 is a separate component, such as a smartphone or tablet. In embodiments, display 140 is round, but in other embodiments, can be implemented in any form, such as rectangular or oblong. In embodiments, display 140 includes one or more actuators, such as buttons or keys. In embodiments, display 140 includes a touch type capacitance button. In embodiments, display 140 is a touchscreen.

FIG. 2A shows an upper exploded view, and FIG. 2B shows a lower exploded view, of the example cosmetic deposition device. In embodiments, cosmetic deposition device 100 includes an internal component 150, cosmetic deposition assembly 110, and position sensor 115. In embodiments, cosmetic deposition device 100 includes a reservoir 145 and a processor 125. In embodiments, internal component 150 is configured to hold cosmetic deposition assembly 110 in place within housing 105. In embodiments, internal component 150 is structurally coupled to cosmetic deposition assembly 110 and reservoir 145.

In embodiments, cosmetic deposition assembly 110 includes position sensor 115 and one or more cameras 120A, 120B. In embodiments, cameras 120A, 120B are located on cosmetic deposition assembly 110 but in at least some embodiments, cameras 120A, 120B are located on housing 105. In embodiments, as cosmetic deposition assembly 110 moves across a surface, such as a subject's face, cameras 120A, 120B capture a plurality of images of the surface. In embodiments, cameras 120A, 120B capture a plurality of images of a facial feature as the cosmetic deposition device 100 moves over the facial feature. In embodiments, cosmetic deposition device 100 includes two cameras 120A and 120B. In embodiments, such as illustrated at FIG. 2B, a first camera 120A is located at a first portion of the cosmetic deposition device 100, and a second camera 120B is located at a second portion of the cosmetic deposition device 100, e.g., opposite the first portion.

In embodiments, as shown at FIG. 2B, cosmetic deposition device 100 includes one or more light sources 130A, 130B. In embodiments, light sources 130A, 130B are LEDs. Though two light sources 130A, 130B are shown, any number of light sources can be implemented on the cosmetic deposition device 100, according to embodiments. In embodiments, light sources 130A, 130B are positioned on the cosmetic deposition assembly 110, but in other embodiments, light sources 130A, 130B are positioned on the front side of cosmetic deposition device 100.

In embodiments, cosmetic deposition assembly 110 includes one or more position sensors 115. While one position sensor 115 is shown at FIG. 2A, it should be understood that any number of position sensors 115 can be implemented. In embodiments, at least one position sensor 115 is a rolling position sensor 115, such as a sensor wheel. In such embodiments, position sensor 115 is configured to roll across the facial feature as cosmetic deposition assembly 110 is moved over the facial feature. In this manner, position sensor 115 detects a position of the facial feature as the cosmetic deposition device 100 moves over the facial feature. In embodiments, position sensor 115 is further configured to detect the curvature of the facial feature or the subject's face, i.e., the portion of the biological surface of the subject.

In embodiments, cosmetic deposition device 100 includes a processor 125. In embodiments, processor 125 is operably and/or communicatively coupled to cosmetic deposition assembly 110, position sensor 115, and camera 120. The processor 125 is configurable to receive a makeup image file, detect a position and a curvature of the portion of the biological surface based on the position sensor, and direct the cosmetic deposition assembly to print the cosmetic style based on the makeup file at a location. In embodiments, processor 125 is further configured to detect the lighting of the facial feature, and direct one or more light sources 130A, 130B to illuminate the facial feature. While one processor 125 is illustrated, it should be understood that any number of processors can be implemented into cosmetic deposition device 100.

In embodiments, cosmetic deposition device 100 includes a reservoir 145. In embodiments, the reservoir 145 is configured to hold one or more cosmetic inks or dyes, or other compositions for the cosmetic style. In embodiments, the reservoir holds any number of cosmetic inks or dyes as needed to print the cosmetic style. In embodiments, the reservoir 145 includes one or more cartridges, such that reservoir 145 can hold any number of colors, compositions, finishes, or formulations of the cosmetic inks or dyes.

In embodiments, processor 125 is further communicatively coupled to reservoir 145 and cosmetic deposition assembly 110. In embodiments, processor 125 directs reservoir 145 and cosmetic deposition assembly 110 to fabricate a cosmetic style, such as a temporary tattoo, or makeup printed in the shape of the facial feature. In embodiments, the cosmetic style is selected from an eyebrow, an eyeshadow, a concealer, a primer, a foundation, a blush, a lipliner, a lipstick, a bronzer, an eyeliner, a freckle pattern, a facial hair, a hair design, such as facial hair or a hairline design, or a highlighter.

In embodiments, cosmetic deposition assembly 110 is coupled to the cosmetic deposition device 100 with a flexible connector 160. In embodiments, flexible connector 160 is a pivot, a hinge, or a joint. In embodiments, flexible connector 160 enables cosmetic deposition assembly 110 to be articulated. In embodiments, this allows for more accurate scans or printing of the surface. In embodiments, this further allows cosmetic deposition assembly 110 to determine a curvature of the surface.

In embodiments, circuitry operably connected to cosmetic deposition assembly 110, position sensor 115, and when present, display 140, includes circuitry coupled to a piezo electric actuator configured to dispense and deposit a cosmetic composition responsive to an applied electrical charge sequence based on a cosmetic style protocol.

In embodiments, circuitry operably connected to cosmetic deposition assembly 110, position sensor 115, and when present, display 140, includes circuitry that is configured to generate an instruction set based on one or more inputs associated with the cosmetic style that causes applicator component 112 to dispense and deposit a cosmetic composition according to a cosmetic style protocol.

Figure 3:
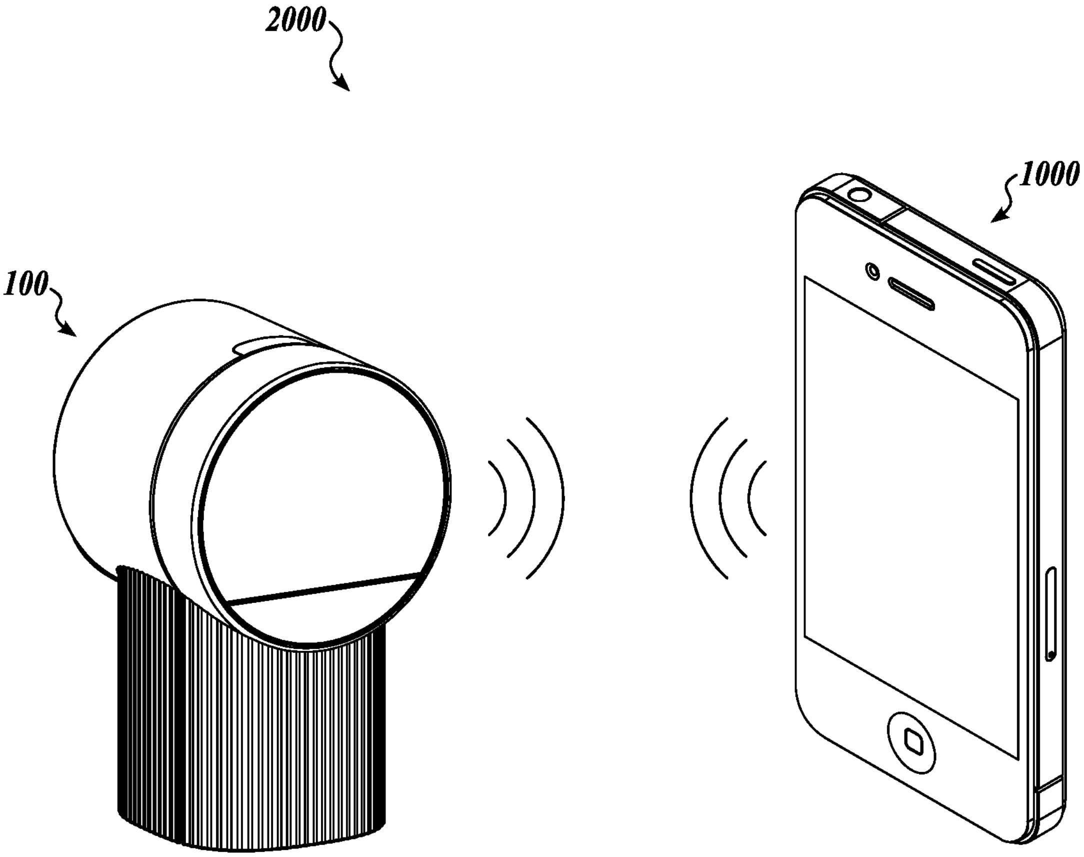
FIG. 3 shows a first example system for application of a cosmetic style to a portion of a biological surface of a subject.
Figure 4:
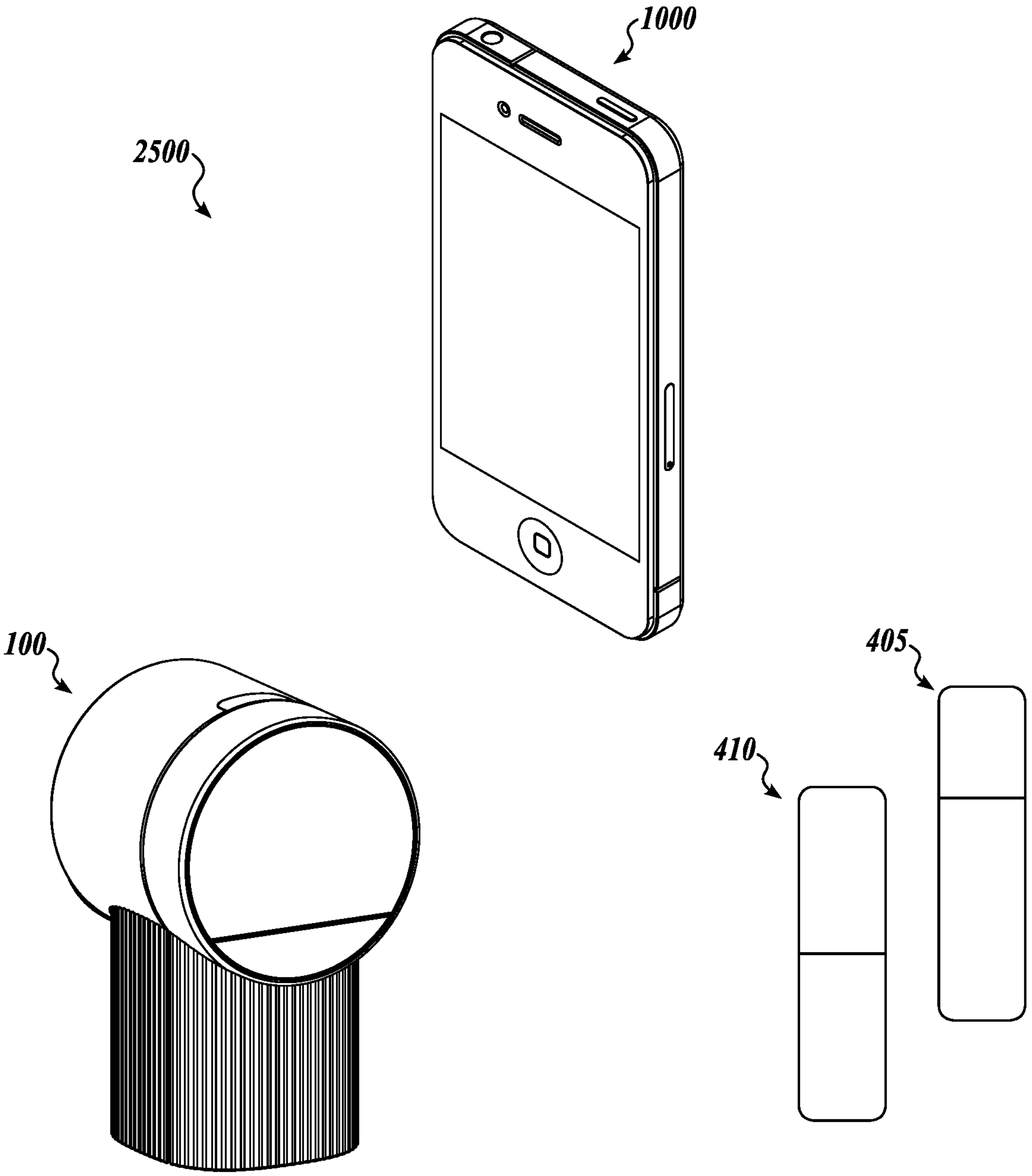
FIG. 4 shows a second example system for application of a cosmetic style to a portion of a biological surface of a subject.

FIG. 3 shows a first example system 2000 for applying a cosmetic style, in accordance with the disclosure. System 2000 for applying a cosmetic style includes a smart device 1000 and a cosmetic deposition device 100. The system 2000 of FIG. 3, and system 2500 of FIG. 4, is generally configured for application of a cosmetic style to a portion of a biological surface of a subject. The system comprises a cosmetic deposition device 100 and a smart device 1000 that comprises circuitry configured to select the cosmetic style from a plurality of cosmetic styles, display the cosmetic style on an image of the portion of the biological surface of the subject, and transmit the cosmetic style as a makeup image file to the cosmetic deposition device. The circuitry of the cosmetic deposition device 100 is operably connected (or is operably connectable) to the circuitry of the smart device 1000 and is further configured to receive the makeup image file from the smart device 1000 and direct the cosmetic deposition assembly to print the cosmetic style with passage of the dye from the reservoir through the applicator component to the portion of the biological surface based on the makeup image file. In example embodiments, the smart device 1000 is a smartphone or other consumer computational device and the circuitry of the smart device 1000 is configurable with a processor or microprocessor programmable with processor-executable instructions stored on a non-transitory machine-readable medium of the smart device 1000.

Accordingly, in embodiments, smart device 1000 includes a software application configured to select a cosmetic style from a plurality of cosmetic styles, display the cosmetic style on an image of a portion of skin of the subject, and transmit the cosmetic style as a makeup image file, as shown and described herein in detail at FIGS. 6A, 6B, and 7A-7C. In embodiments, as illustrated at FIG. 3, smart device 1000 is a smartphone. It should be understood that smart device 1000 can be implemented according to any number of forms, including but not limited to a tablet, laptop, or computer. In embodiments, smart device 1000 is operably and/or communicatively coupled to cosmetic deposition device 100. In embodiments, smart device 1000 is communicatively coupled to cosmetic deposition device 100 by a wireless connection, such as a Bluetooth® connection, a Bluetooth® low energy (BLE) connection, and/or a Wi-Fi® connection, and/or a wired connection.

In embodiments, cosmetic deposition device 100 includes a position sensor, a reservoir configured to hold one or more compositions, and a cosmetic deposition assembly including an applicator component. In embodiments, the cosmetic deposition assembly is configured to print the cosmetic style with passage the composition through the applicator component. In embodiments, cosmetic deposition device 100 further includes a processor configured to receive the makeup image file, detect a position and a curvature of the portion of skin based on the position sensor, and direct the cosmetic deposition assembly to print the cosmetic style, e.g., at a specific location, as described herein.

FIG. 4 shows a second example system 2500 for autonomously applying a cosmetic style, in accordance with the disclosure. In embodiments, system 2500 further includes a primer 405, and a topcoat 410. In embodiments, primer 405 is configured to be applied before the cosmetic style. In embodiments, primer 405 is held in a container, such as shown at FIG. 4. In embodiments, primer 405 includes an applicator configured to brush on, spread, or apply primer 405. In embodiments, primer 405 is added to a surface manually, such as with the hand of a subject of system 2500. In embodiments, primer 405 is configured to prime the surface of a subject's skin or hair to accept the cosmetic style. In embodiments, primer 405 has an adhesive property, such that it sticks to the cosmetic style. In embodiments, primer 405 is placed inside a reservoir of cosmetic deposition device 100. In embodiments, primer 405 is printed by the cosmetic deposition device 100. Primer 405 may be implemented according to any form, such as a solid, a liquid, a cream, or a gel. In embodiments, primer 405 is configured to be sprayed onto the surface.

In embodiments, system 2500 further includes a topcoat 410 configured to be applied after the cosmetic style. In embodiments, topcoat 410 is held in a container, such as shown at FIG. 4. In embodiments, topcoat 410 includes an applicator configured to brush on, spread, or apply topcoat 410. In embodiments, topcoat 410 is added to a surface manually, such as with the hand of a subject of system 2500. In embodiments, topcoat 410 seals the cosmetic style to keep the cosmetic style from smudging, smearing, moving, fading, or otherwise be damaged or degraded. In embodiments, topcoat 410 has an aesthetic property, such as a finish. In embodiments, the finish may be a glitter finish, a glossy finish, a dewy finish, a matte finish, or the like. In embodiments, topcoat 410 is placed inside a reservoir of cosmetic deposition device 100. In embodiments, topcoat 410 is printed by cosmetic deposition device 100. Topcoat 410 may be implemented according to any form, such as a solid, a liquid, a cream, or a gel. In embodiments, topcoat 410 is configured to be sprayed onto the surface.

Figure 5A:
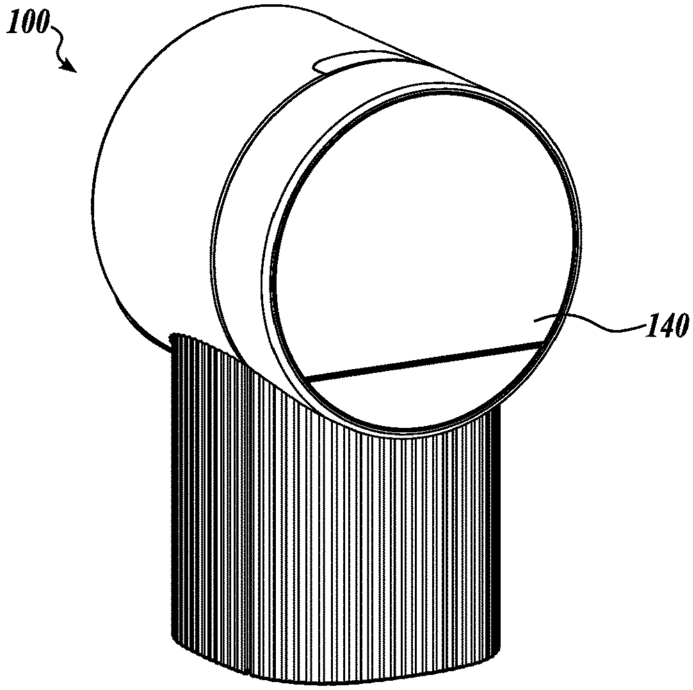
FIG. 5A shows a rear perspective view of the example cosmetic deposition device.
Figure 5B:
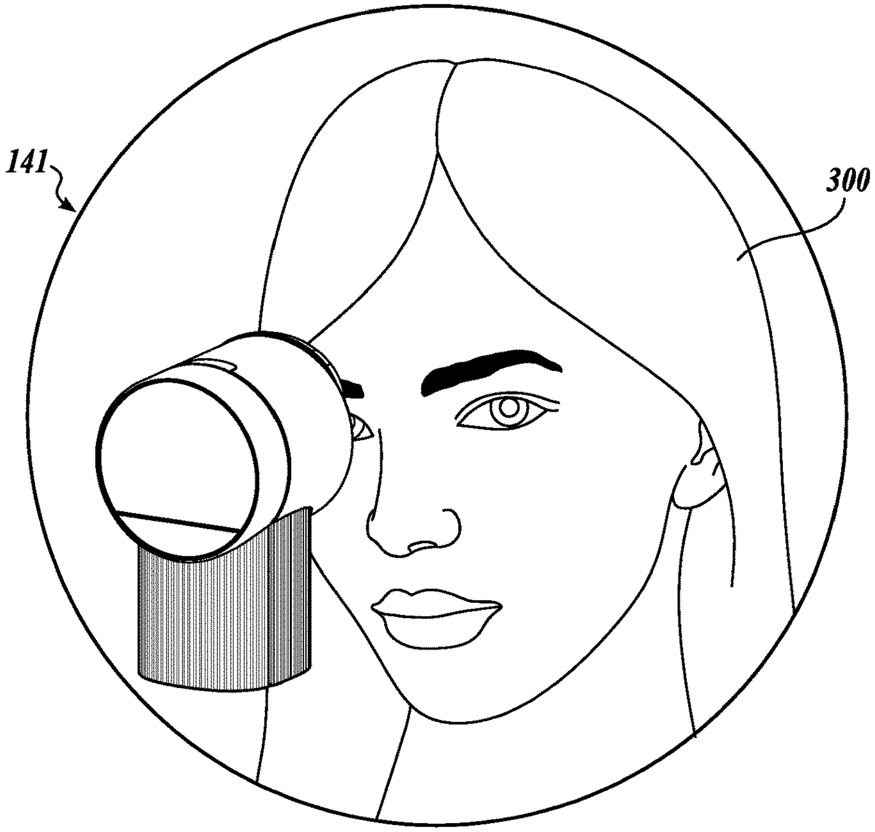
FIG. 5B shows a rear perspective view of the example cosmetic deposition device, during use to apply a cosmetic style to an eyebrow of a subject.

FIGS. 5A-5B show the example cosmetic deposition device, including with an example display 140 of an example cosmetic deposition device 100, in accordance with the disclosure, in use applying 141 the cosmetic style to the portion of skin, e.g., eyebrow, of the subject 300.

Figure 6B:
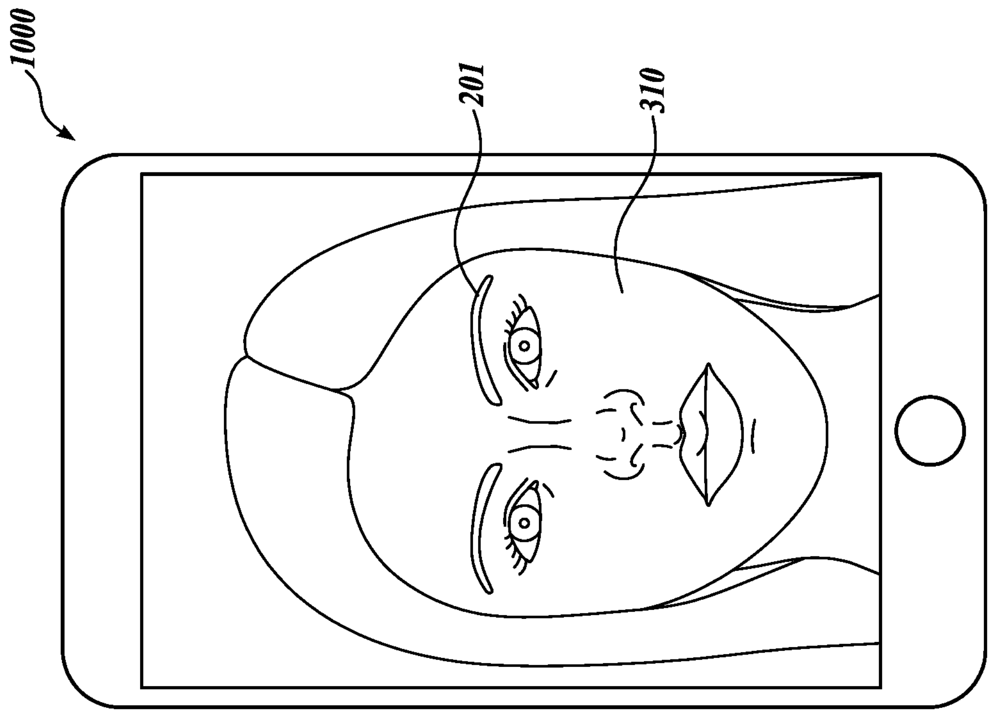
FIG. 6B shows an example image of a subject for planning, depiction, or selection of a cosmetic style from a plurality of cosmetic styles.
Figure 6A:
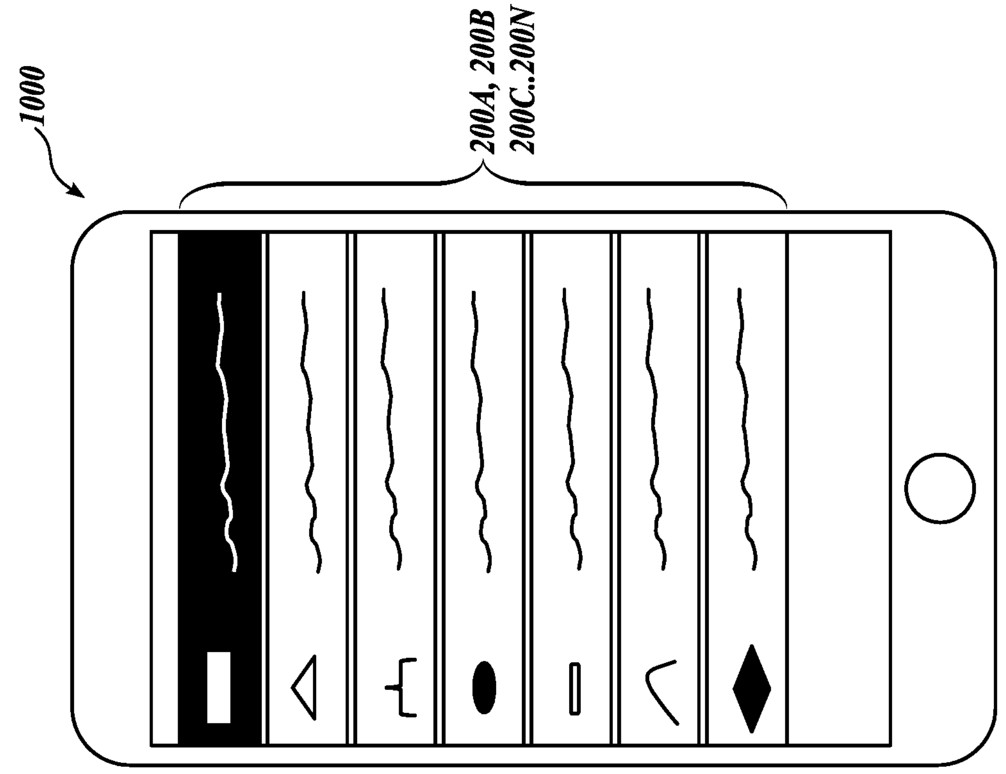
FIG. 6A shows an example user interface of a smart device of a system for depiction or selection of a cosmetic style from a plurality of cosmetic styles.

FIGS. 6A-6B show example processes of an example system during use, in accordance with the disclosure. In embodiments, the system comprises system 2000, system 2500, or another system as described herein. FIG. 6A shows a user interface of an example software application of a smart device 1000. In embodiments, the software application depicts a plurality of cosmetic styles 200A, 200B, 200C . . . 200N. In embodiments, a subject selects a cosmetic style of the plurality of cosmetic styles 200A, 200B, 200C . . . 200N. In embodiments, the subject selects the cosmetic style by clicking, tapping, or otherwise choosing the cosmetic style. In FIG. 6A, a selected cosmetic style is shown in black (i.e., top row). In embodiments, the software application displays the plurality of cosmetic styles 200A, 200B, 200C . . . 200N as a list or drop-down menu. In embodiments, each cosmetic style of the plurality of cosmetic styles 200A, 200B, 200C . . . 200N includes a graphical representation of the cosmetic style, a description of the cosmetic style, or both. In embodiments, the software application is further configured to recommend a cosmetic style from the plurality of cosmetic styles 200A, 200B, 200C . . . 200N to the subject. In embodiments, the recommendation is based on a trending cosmetic style, a color of the subject's hair, skin, or lips, a past cosmetic style selected by the subject, a shape of the subject's eyes, eyebrows, eyelids, nose, lips, cheeks, or forehead, a location of the subject, or a color of the subject's clothing, or another feature or characteristic of the subject or other individual.

FIG. 6B shows an example graphic of a software application on the smart device 1000, displaying an image of the subject's face 310 configured for depiction of an overlay of a cosmetic style on a biological surface of the face 310, for example, an eyebrow 201. In embodiments, the image is a live video feed from a camera of the smart device 1000 or a camera of the cosmetic deposition device (not shown at FIG. 6B). In embodiments, the image is a static photo, or a previously taken video. In such embodiments, the subject uploads a photo or a video to the smart device 1000 where it is shown by the software application.

Figure 7A:
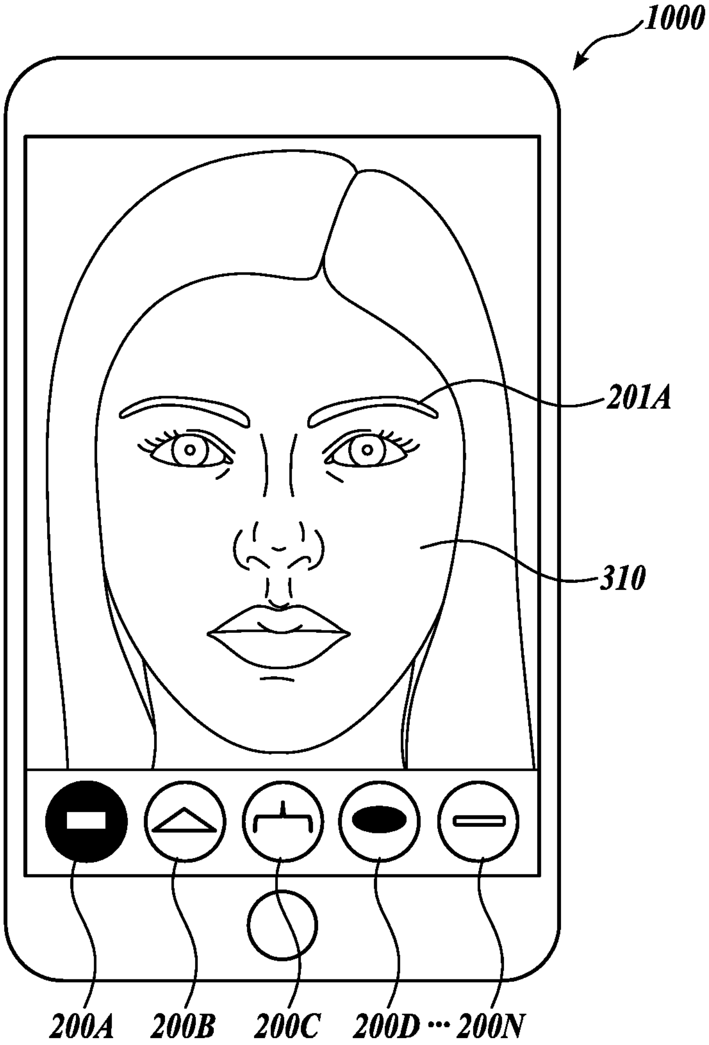
FIG. 7A shows an example overlay image of a first cosmetic style virtually applied to a portion of skin of the subject.
Figure 7B:
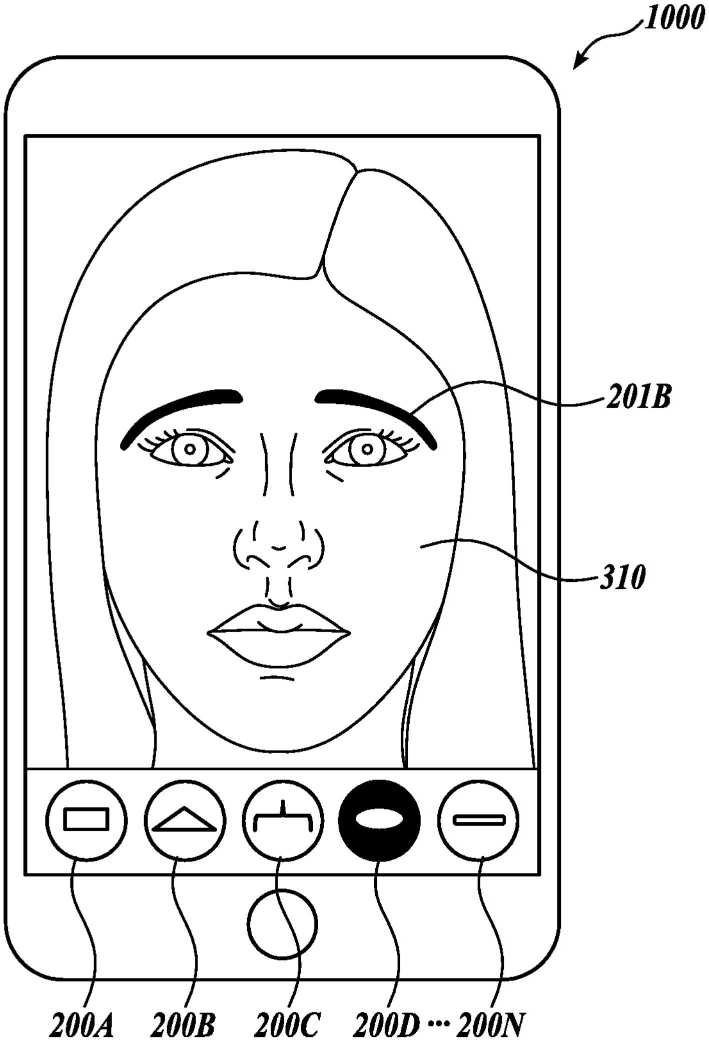
FIG. 7B shows an example overlay image of a second cosmetic style virtually applied to a portion of skin of the subject.

FIGS. 7A-7D show example processes of an example system in use, in accordance with the disclosure. In embodiments, the system is system 2000, system 2500, or another system as described herein. FIG. 7A shows an example software application of a smart device 1000. In embodiments, FIG. 7A follows FIG. 6B in a sequence of steps. In embodiments, a subject scrolls through a plurality of cosmetic styles 200A, 200B, 200C, 200D . . . 200N while the smart device displays an image of the subject's face 310 and a selected cosmetic style 201A. In such embodiments, the subject selects the selected cosmetic style 201A and change selections among cosmetic styles of the plurality of cosmetic styles 200A, 200B, 200C, 200D . . . 200N in real time. In embodiments, the plurality of cosmetic styles 200A, 200B, 200C, 200D . . . 200N are shown by the smart device 1000 in such a manner that depiction of the styles does not obscure the image of the subject's face 310, such as at a bottom, top, or side of a screen of the smart device 1000. As shown at FIG. 7A, cosmetic style 200A is selected and is displayed as an overlay on the subject's face as selected cosmetic style 201A. As shown at FIG. 7B, the subject has selected a new cosmetic style 200D, which is displayed as an overlay on the image of the subject's face 310 as a selected cosmetic style 201B. In this manner, the subject can change selections between any number of cosmetic styles from the plurality of cosmetic styles 200A, 200B, 200C, 200D . . . 200N before adjusting or printing a cosmetic style.

Figure 7C:
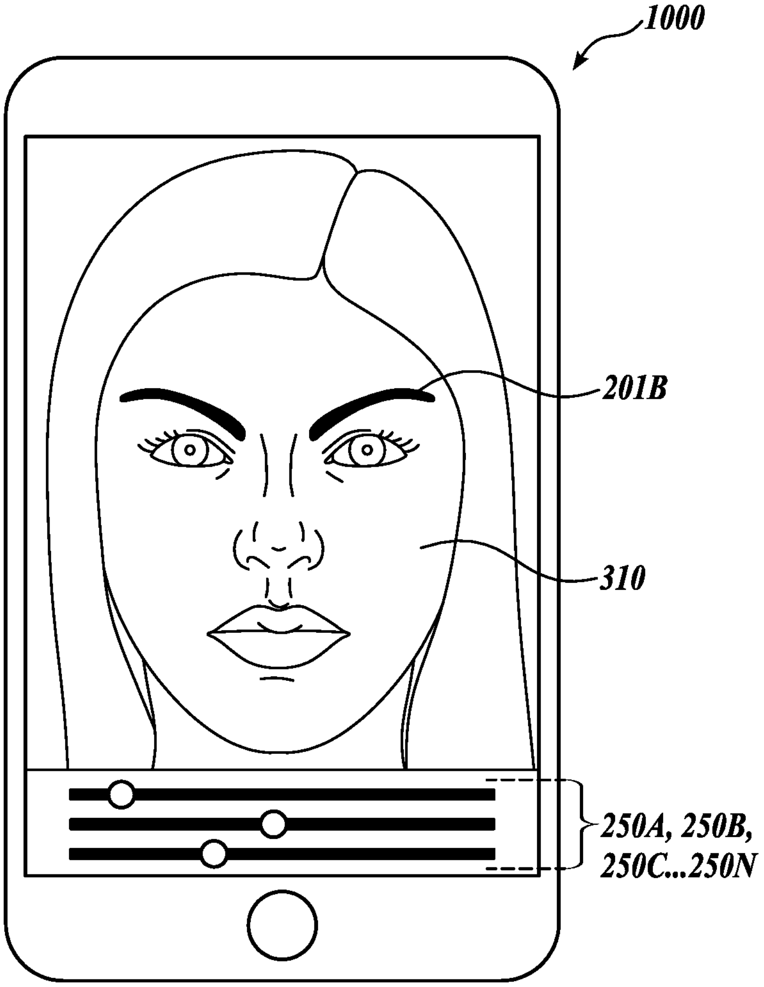
FIG. 7C shows an example overlay image of a third cosmetic style virtually applied to a portion of skin of the subject.

FIG. 7C shows a subject the selected cosmetic style 201B to fit their preferences. In embodiments, FIG. 7C follows FIG. 6B in a sequence of steps. In embodiments, the application suggests adjustments to the selected cosmetic style 201B. In embodiments, the suggested adjustments are based on a shape of the subject's face, the shape of a facial feature of the subject, a color of the subject's hair, skin, eyes, or clothing, or a trending adjustment, e.g., an adjustment that is trending with one or a plurality of subjects. In embodiments, adjusting the selected cosmetic style 201B includes changing a color, a size, a length, a width, a hair size, a pattern, an angle, a position, a location of the cosmetic style, or a combination thereof of the selected cosmetic style 201B. In embodiments, such as when the selected cosmetic style 201B includes discrete elements, the discrete elements of the selected cosmetic style 201B can be adjusted independently. For example, if the selected cosmetic style 201B is a makeup overlay of a pair of eyebrows (as shown at FIG. 7C) each eyebrow of selected cosmetic style 201B can be adjusted independently. As another example, if the selected cosmetic style 201B is a lipstick, a blush, and an eyeshadow, the lipstick, the blush, and the eyeshadow can all be adjusted independent of one another.

In embodiments, the selected cosmetic style 201B is adjusted with a plurality of sliders 250A, 250B, 250C . . . 250N. In embodiments, the cosmetic style is adjusted with another mechanism, such as a plurality of presets, manipulation of the cosmetic style with a touch screen, or otherwise. Once the subject is satisfied with the selected cosmetic style, the subject can transmit the cosmetic style as a makeup file to a cosmetic deposition device. In embodiments, the software application can further store the selected and/or adjusted cosmetic style as a preset, such that the subject can select and/or print the same cosmetic style later.

As shown at FIG. 5B, the subject 300 applies the selected and/or adjusted cosmetic style to a surface with the cosmetic deposition device 100. In embodiments, the surface is a face, skin, or hair. In embodiments, the subject 300 is a second person, wherein a first person applies the cosmetic style to the second person. In embodiments, the first person can be a trained subject, such as at a store, salon, spa, or makeup counter.

In operation, cosmetic deposition device 100 receives the makeup image file of the selected cosmetic style 201B from the smart device. The subject 300 can hold the cosmetic deposition device 100 with the handle and move the cosmetic deposition assembly over a surface. In embodiments, the surface is a face. In embodiments, the surface is skin or hair. In embodiments, the surface is a facial feature. As cosmetic deposition device 100 is moved over the surface, cosmetic deposition device 100 detects a position and a curvature of the body based on the position sensor and directs the cosmetic deposition assembly to print the cosmetic style at a specific location, e.g., a location adjacent the applicator component. In embodiments, the subject 300 directs the cosmetic deposition device 100 over the surface before selecting, adjusting, and/or printing the cosmetic style. In such embodiments, cosmetic deposition device 100 is configured to detect a facial feature of the subject 300 to enable the software application to provide a recommendation based on the subject's facial features, detect a position of the one or more facial features, or a combination thereof.

In embodiments, the cosmetic deposition device 100 senses its own location at, on, or along the surface, and automatically applies one or more cosmetic style to the location on the surface. In embodiments, the cosmetic style is manually applied, as activated with a button or switch. In this manner, the cosmetic deposition device 100 prints the cosmetic style only in the location desired by the subject, based on the cosmetic style selected, the adjustments made to the cosmetic style, or a combination thereof.

Figure 8:
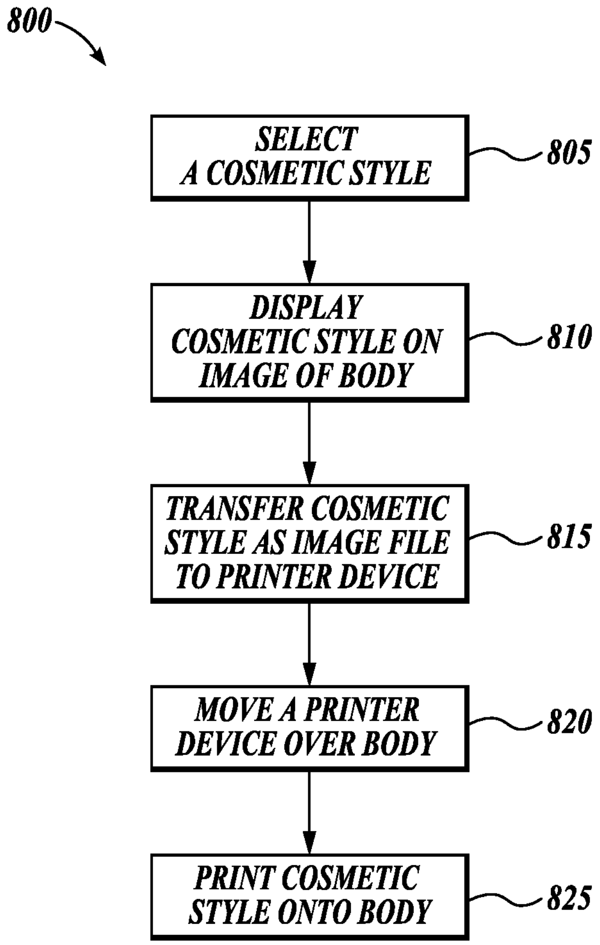
FIG. 8 shows an example first method of use of a system for selection and application of a cosmetic style.

In an aspect, a method of applying a cosmetic style with a system is provided. In embodiments, a method includes selecting the cosmetic style from a plurality of cosmetic styles, displaying the cosmetic style on an image of a subject, transferring the cosmetic style as an image file to a cosmetic deposition device, moving the cosmetic deposition device over a portion of the subject, and printing the cosmetic style onto the subject at a location based on one or more position sensors of the cosmetic deposition device. FIG. 8 shows an example method 800 of using an example system (e.g., system 2000 or system 2500), in accordance with the disclosure.

At block 805, a cosmetic style is selected. In embodiments, the cosmetic style is selected from a plurality of cosmetic styles. In embodiments, the cosmetic style is selected as shown at FIGS. 6A, 7A, or a combination thereof. In embodiments, the cosmetic style is selected from an eyebrow, an eyeshadow, a concealer, a primer, a foundation, a blush, a lipliner, a lipstick, a bronzer, an eyeliner, a freckle pattern, a facial hair, a hair design, a highlighter, or a combination thereof.

At block 810, the cosmetic style is displayed on an image of a subject. In embodiments, the image of the subject comprises a live video feed from a smart device or the cosmetic deposition device. In embodiments, the cosmetic style is displayed as shown at FIGS. 6B. 7B, or a combination thereof.

At block 815, the cosmetic style is stored as an image file and transferred to a cosmetic deposition device. In embodiments, the image file is a makeup image file. In embodiments, the image file is stored with a smart device software application. In embodiments, the cosmetic deposition device receives the image file of the cosmetic style through a wireless or wired connection with the smart device, such as shown at FIG. 3.

At block 820, the cosmetic deposition device is moved over the body of the subject. In embodiments, the cosmetic deposition device is moved as shown at FIG. 5B. In embodiments, the cosmetic deposition device is moved by an operator of the device onto a person. In embodiments, the cosmetic deposition device is moved by a subject of the cosmetic deposition device, e.g., onto their own body.

At block 825, the cosmetic style is printed onto the body of the subject. In embodiments, the cosmetic style is printed at a location of the body as shown in the image of the body. In embodiments, the cosmetic style is printed by the cosmetic deposition device. In embodiments, the cosmetic style is comprised of one or more cosmetic dyes or inks stored inside one or more reservoirs of the cosmetic deposition device. In embodiments, a primer is applied before the cosmetic style is printed, and/or a topcoat is applied after the cosmetic style is printed.

Figure 9:
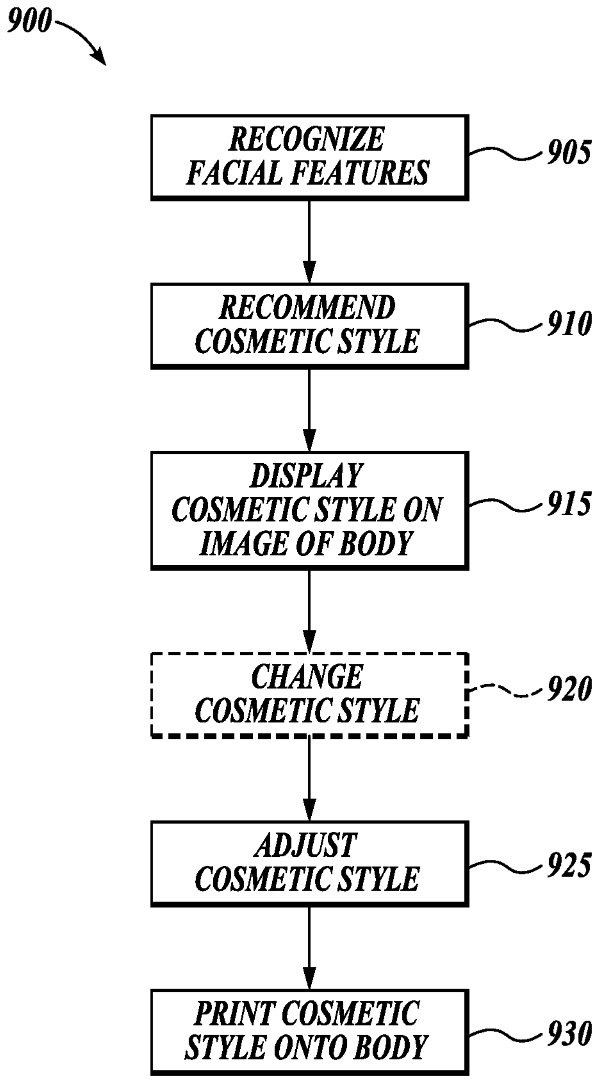
FIG. 9 shows an example second method of use of a system for selection and application of a cosmetic style.

FIG. 9 shows an example method 900 of using an example system of the disclosure. At block 905, a plurality of facial features of the image of the body of the subject are recognized, e.g., by a software application of a smart device analyzing the image. In embodiments, the plurality of facial features is recognized by the cosmetic deposition device, through one or more cameras on the cosmetic deposition device. In embodiments, the depth and/or curvature of the plurality of facial features is recognized by the proximity sensor on the cosmetic deposition device. As described herein, facial features can include cheeks, cheekbones, eyes, eyelids, waterlines, lips, eyebrows, noses, hair lines, ears, chins, or the like.

At block 910, the system recommends a cosmetic style. In embodiments, the cosmetic style is recommended based on a trending cosmetic style, a color of a subject's hair, skin, eyes, or lips, a past cosmetic style selected by the subject, a shape of the subject's eyes, eyebrows, nose, lips, cheeks, or forehead, a location of the subject, or a color of the subject's clothing. In embodiments, the cosmetic style is selected from an eyebrow, an eyeshadow, a concealer, a primer, a foundation, a blush, a lipliner, a lipstick, a bronzer, an eyeliner, a freckle pattern, a facial hair, a hair design, a highlighter, or a combination thereof.

At block 915, the cosmetic style is displayed on the image of the body of the subject, as described herein.

Optionally, at block 920, the subject changes the selected cosmetic style. In embodiments, changing the cosmetic style includes selecting another cosmetic style from the plurality of cosmetic styles instead of the cosmetic style. In embodiments, the subject can switch the cosmetic style multiple times before deciding to print the cosmetic style.

At block 925, the subject adjusts the cosmetic style. In embodiments, adjusting the cosmetic style includes changing a color, a size, a length, a width, a hair size, a pattern, an angle, a position, a location of the cosmetic style, or a combination thereof of the cosmetic style.

At block 930, the system prints the cosmetic style onto a portion of the body of the subject. In embodiments, as described herein, the cosmetic deposition device accurately detects and prints the cosmetic style onto a specific location of a subject's body.

It should be understood that method 800 and method 900 should be interpreted as merely representative and not exhaustive. In embodiments, process blocks of method 800 and 900 can be performed simultaneously, sequentially, in a different order, or even omitted, without departing from the scope of this disclosure.

Figure 10:
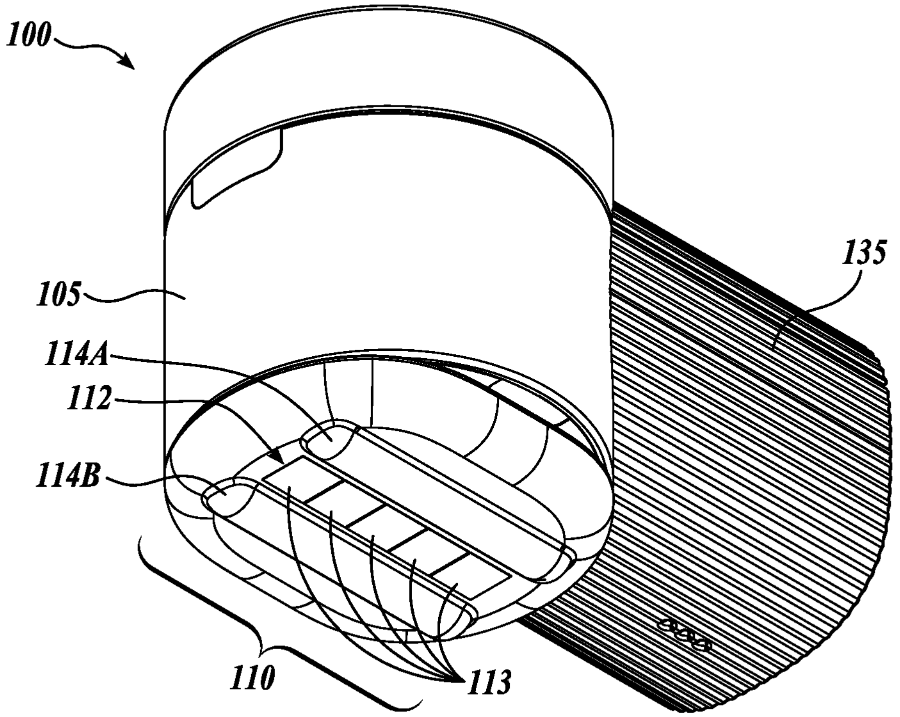
FIG. 10 shows a lower front side perspective view of an example cosmetic deposition device for application of a cosmetic style to a portion of a biological surface of a subject, the device including an applicator component with a plurality of applicator nozzles.

Referring now to FIG. 10, there is shown an example cosmetic deposition device that comprises an applicator component 112 that is adjustable with a plurality of applicator nozzles 113. While five applicator nozzles 113 are shown as having square shapes and as being arranged in an array or grid in the example embodiment, other numbers, sizes, shapes, and configurations of the plurality of applicator nozzles 113 are explicitly envisioned without departing from the scope of the present disclosure. For example, the plurality of applicator nozzles 113 could be comprised of 2, 3, 4, 6, 7, 8, 9, 10, 11, 12, 13, 14, 15, 16, 17, 18, 19, 20, or more applicator nozzles 113, according to embodiments.

Figure 11A:
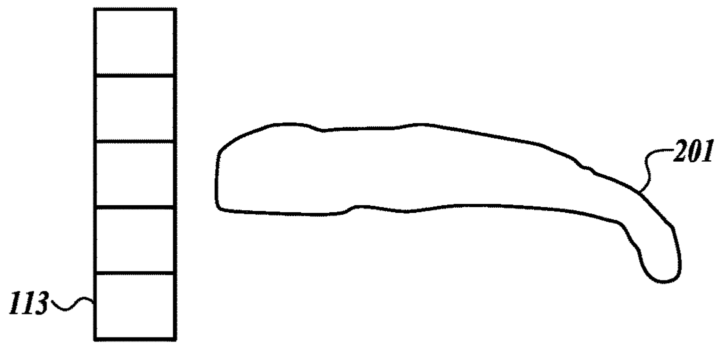
FIG. 11A shows a graphic representation of the plurality of applicator nozzles and an eyebrow before a printing operation.
Figure 11B:
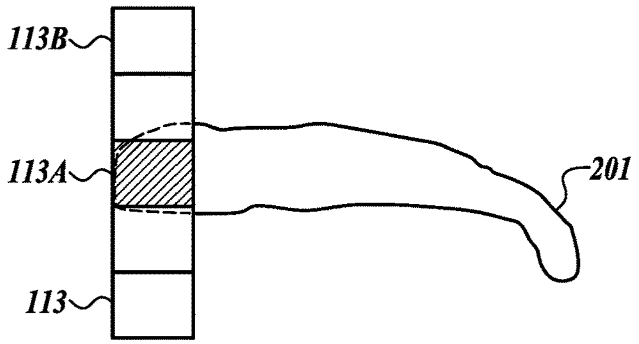
FIG. 11B shows a graphic representation of the plurality of applicator nozzles and the eyebrow at the onset of the printing operation.
Figure 11C:
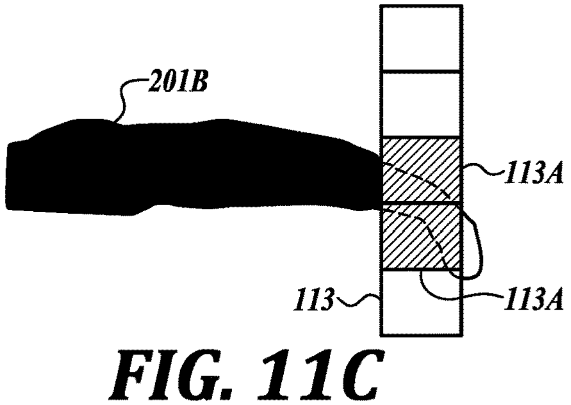
FIG. 11C shows a graphic representation of the plurality of applicator nozzles and the eyebrow during the printing operation at a curved portion of the eyebrow.
Figure 11D:
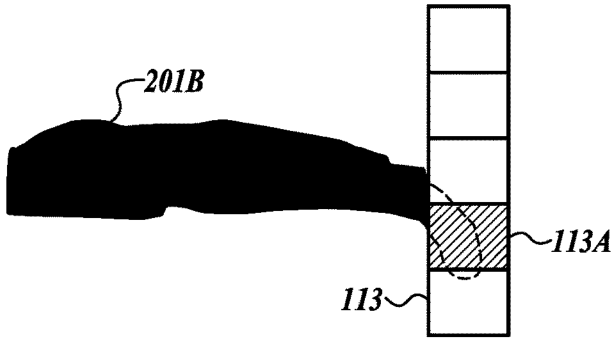
FIG. 11D shows a graphic representation of the plurality of applicator nozzles and the eyebrow during the printing operation at an end portion of the eyebrow.

In embodiments, the applicator nozzles of the plurality of applicator nozzles 113 are selectively controllable, for selective activation and deactivation, by circuitry of the cosmetic deposition device or system. As shown at FIGS. 11A-11D, during application of the cosmetic style to the portion of the biological surface (e.g., an eyebrow 201), the cosmetic deposition device and the plurality of applicator nozzles 113 are moved, linearly or approximately linearly, from a first side of the biological surface (e.g., left; FIG. 11A) to a second side of the biological surface (e.g., right; FIG. 11D).

Printing to the portion of the biological surface occurs during the movement of the device and produces the selected cosmetic style 201B having ink, dye, and/or other cosmetic composition(s) deposited thereto (shown as black fill-in; see FIGS. 11C-11D) forming a printed biological surface. As the plurality of applicator nozzles 113 are moved across the biological surface, the position sensor senses the position of at least a portion of the cosmetic deposition device relative to the portion of the biological surface and transmits to circuitry (e.g., a processor) to automatically correct for actual or expected deviations of the portion of the cosmetic deposition device relative to the portion of the biological surface by selectively activating (see, e.g., 113A of FIGS. 11B-11D) and/or selectively deactivating (see, e.g., 113B of FIGS. 11B-11D) one or more applicator nozzles of the plurality of applicator nozzles 113 with the circuitry. Activated nozzles are actively depositing substance(s) therefrom to the biological surface, and deactivated nozzles are not actively depositing substance(s) therefrom. After depositing the cosmetic style thereto, the portion of the biological surface retains the cosmetic style.

Figure 12:
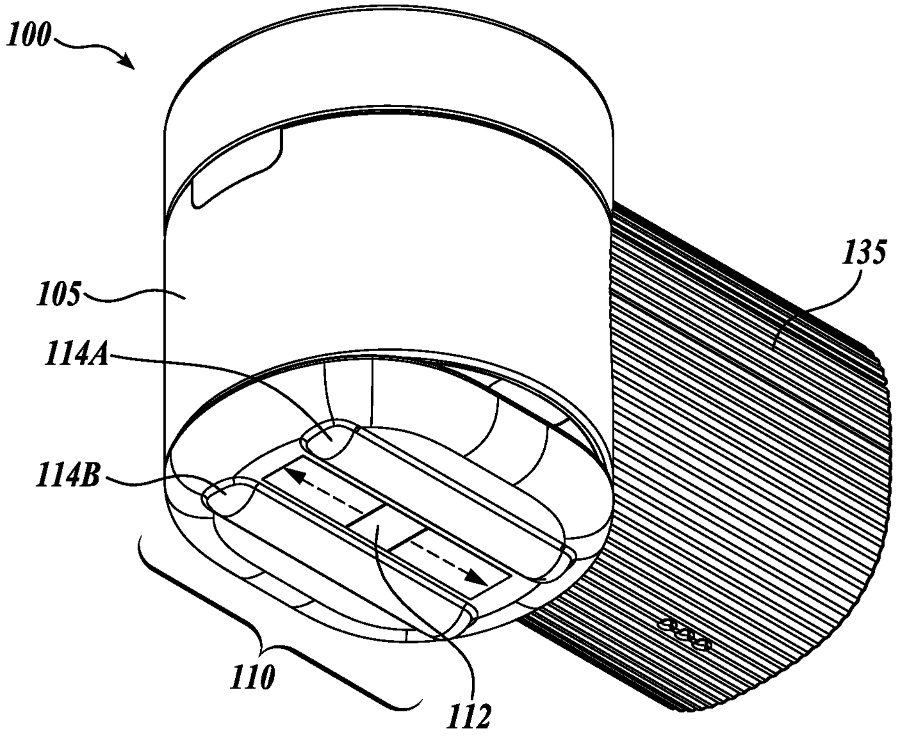
FIG. 12 shows a lower front side perspective view of an example cosmetic deposition device for application of a cosmetic style to a portion of a biological surface of a subject, the device including an applicator component with a movable applicator nozzle.

Referring now to FIG. 12, there is shown an example cosmetic deposition device that comprises an applicator component 112 that is adjustable with a movable applicator nozzle. While a single movable applicator nozzle is shown as having a square shape and as being arranged linearly and as being slidably connected to the cosmetic deposition assembly for a vertical movement of the movable applicator nozzle in the example embodiment, other numbers, sizes, shapes, and configurations of the movable applicator nozzle are explicitly envisioned without departing from the scope of the present disclosure.

Figure 13A:
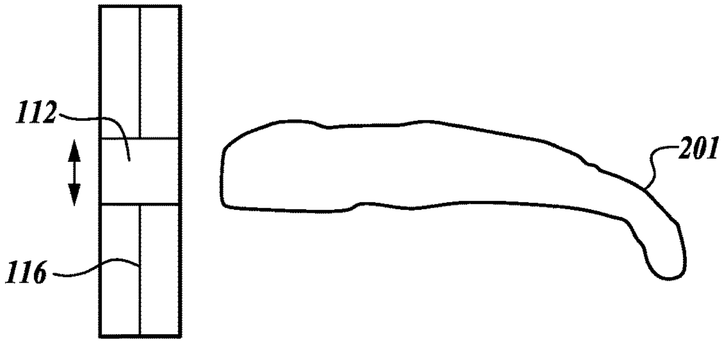
FIG. 13A shows a graphic representation of the movable applicator nozzle and an eyebrow before a printing operation.
Figure 13B:
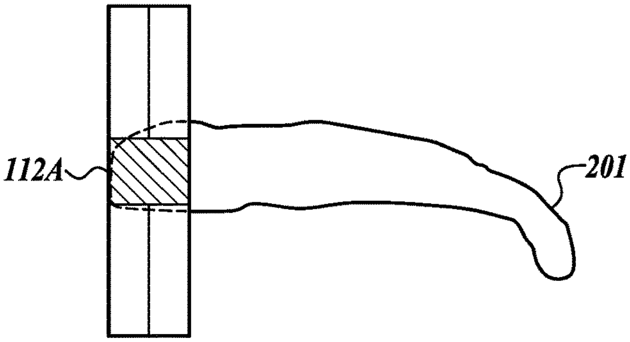
FIG. 13B shows a graphic representation of the movable applicator nozzle and the eyebrow at the onset of the printing operation.
Figure 13C:
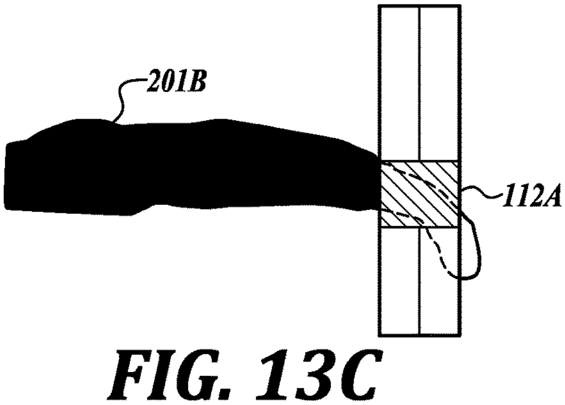
FIG. 13C shows a graphic representation of the movable applicator nozzle and the eyebrow during the printing operation at a curved portion of the eyebrow.
Figure 13D:
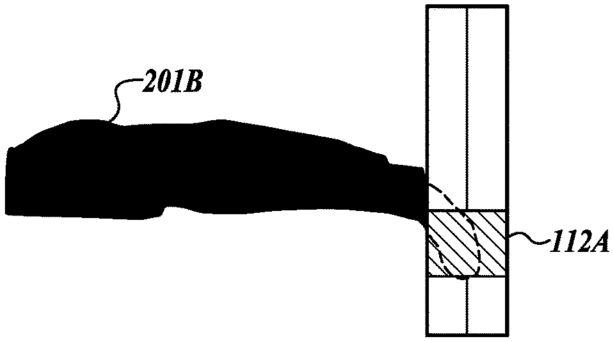
FIG. 13D shows a graphic representation of the movable applicator nozzle and the eyebrow during the printing operation at an end portion of the eyebrow.

In embodiments, and as shown by way of non-limiting example at FIGS. 13A-13D, automatic correction of the printing can comprise selectively moving the movable applicator nozzle, e.g., vertically for a vertical movement of the movable applicator nozzle during deposition of the cosmetic style to the portion of the biological surface as shown, such that a vertical range for deposition of the cosmetic style is increased. In embodiments, the movable applicator nozzle of the applicator component 112 is slidably connected to the cosmetic deposition assembly by a slide structure 116, such as a rod/aperture combination or a groove/tongue combination, that enables controlled, directed sliding movement of the movable applicator nozzle relative to the cosmetic deposition assembly (e.g., 110 of FIG. 12). As shown at FIGS. 13A-13D, during application of the cosmetic style to the portion of the biological surface (e.g., an eyebrow 201), the cosmetic deposition device and the movable applicator nozzle is moved, linearly or approximately linearly, from a first side of the biological surface (e.g., left; FIG. 13A) to a second side of the biological surface (e.g., right; FIG. 13D). Printing to the portion of the biological surface occurs during the movement of the device and produces the selected cosmetic style 201B having ink, dye, and/or other cosmetic composition(s) deposited thereto (shown as black fill-in; see FIGS. 13C-13D) forming a printed biological surface. As the movable applicator nozzle is moved across the biological surface, the position sensor senses the position of at least a portion of the cosmetic deposition device relative to the portion of the biological surface and transmits to circuitry (e.g., a processor) to automatically correct for actual or expected deviations of the portion of the cosmetic deposition device relative to the portion of the biological surface by selectively moving (see, e.g., 112A of FIGS. 13B-13D) the movable applicator nozzle with the circuitry. During use the movable applicator nozzle can be activated such that it is actively depositing substance(s) therefrom to the biological surface. After depositing the cosmetic style thereto, the portion of the biological surface retains the cosmetic style.

In embodiments, the movable applicator nozzle is affixed to a block comprising a screw slidingly engaged therethrough that is operably connected to an electric motor. In such embodiments, activation of the electric motor in a first direction rotates the screw in a first direction and moves the block with the movable applicator nozzle in a first direction, and activation of the electric motor in a second direction rotates the screw in a second direction and moves the block with the movable applicator nozzle in a second direction.

In embodiments, the movable applicator nozzle is operably connected to a servo motor, e.g., an electromechanical actuator, that enables precise control of angular or linear position, velocity, and acceleration, for precise control of movement of the movable applicator nozzle.

In embodiments, a stabilizer mechanism is included in the cosmetic deposition device and is configured for stabilization of the cosmetic deposition assembly 110 during sudden or small movements of the cosmetic deposition device, as can occur during use by a human subject. Since the subject's hand movements can contribute to unexpected changes in the deposition of the cosmetic composition to the biological surface, the stabilizer mechanism stabilizes the cosmetic deposition assembly 110 and counteracts the negative effect these movements would otherwise have on the accuracy of the deposition of the cosmetic composition to the biological surface. While any stabilizer mechanism can be implemented without departing from the scope of the disclosure, in non-limiting example embodiments, a stabilizer mechanism includes springs and/or a gimbal stabilizer that stably connects the cosmetic deposition assembly 110 to the housing 105.

In an aspect, a method of applying a cosmetic style with a cosmetic deposition device of the disclosure is provided. The method comprises moving the cosmetic deposition device over the portion of the biological surface of the subject, printing the cosmetic style onto the portion of the biological surface at a location adjacent to the applicator component, and automatically correcting the printing of the cosmetic style onto the portion of the biological surface. The automatic correction is based on a position of at least a portion of the cosmetic deposition device relative to the portion of the biological surface, and optionally, a detected actual or expected deviation of the portion of the cosmetic deposition device relative to the portion of the biological surface.

In embodiments comprising a plurality of applicator nozzles, for example as shown at FIG. 10 (see, e.g., 113 of FIG. 10), the automatic correction of the printing comprises selectively activating one or more nozzles of the plurality of applicator nozzles 113 and/or selectively deactivating one or more nozzles of the plurality of applicator nozzles 113. In embodiments, the plurality of applicator nozzles 113 is arranged in an array or grid configured for a vertical orientation during deposition of the cosmetic style to the portion of the biological surface, such that a vertical range for deposition of the cosmetic style is increased (e.g., as shown by way of non-limiting example at FIGS. 10 and 11A-11D). In this manner, during use, the subject does not necessarily need to worry about vertically adjusting the cosmetic deposition device for accurate placement of the device and accurate printing onto the biological surface. Since the device or system automatically detects an actual or expected deviation of an active applicator nozzle from the portion of the biological surface, e.g., due to a natural curvature of an eyebrow, the device or system adjusts for the actual or expected deviation during application of the cosmetic style, in real time, by selectively activating (e.g., 113A of FIGS. 11A-11D) and/or selectively deactivating (e.g., 113B of FIGS. 11A-11D) one or more nozzles of the plurality of applicator nozzles 113. In this manner, off-target printing is reduced or eliminated, and the portion of the biological surface is reliably and reproducibly printed according to the cosmetic style.

In embodiments comprising a movable applicator nozzle, for example as shown at FIG. 12 (see, e.g., applicator component 112 of FIG. 12), the automatic correction of the printing comprises selectively moving the movable applicator nozzle. In embodiments, the movable applicator nozzle is slidably connected to the cosmetic deposition assembly for a vertical movement of the movable applicator nozzle during deposition of the cosmetic style to the portion of the biological surface, such that a vertical range for deposition of the cosmetic style is increased (e.g., as shown by way of non-limiting example at FIGS. 12 and 13A-13D). In this manner, during use, the subject does not necessarily need to worry about vertically adjusting the cosmetic deposition device for accurate placement of the device and accurate printing onto the biological surface. Since the device or system automatically detects an actual or expected deviation of (active) movable applicator nozzle from the portion of the biological surface, e.g., due to a natural curvature of an eyebrow, the device or system adjusts for the actual or expected deviation during application of the cosmetic style, in real time, by selectively moving (e.g., as shown at FIGS. 13A-13D) the movable applicator nozzle, during active printing. In this manner, off-target printing is reduced or eliminated, and the portion of the biological surface is reliably and reproducibly printed according to the cosmetic style.

Figure 14:
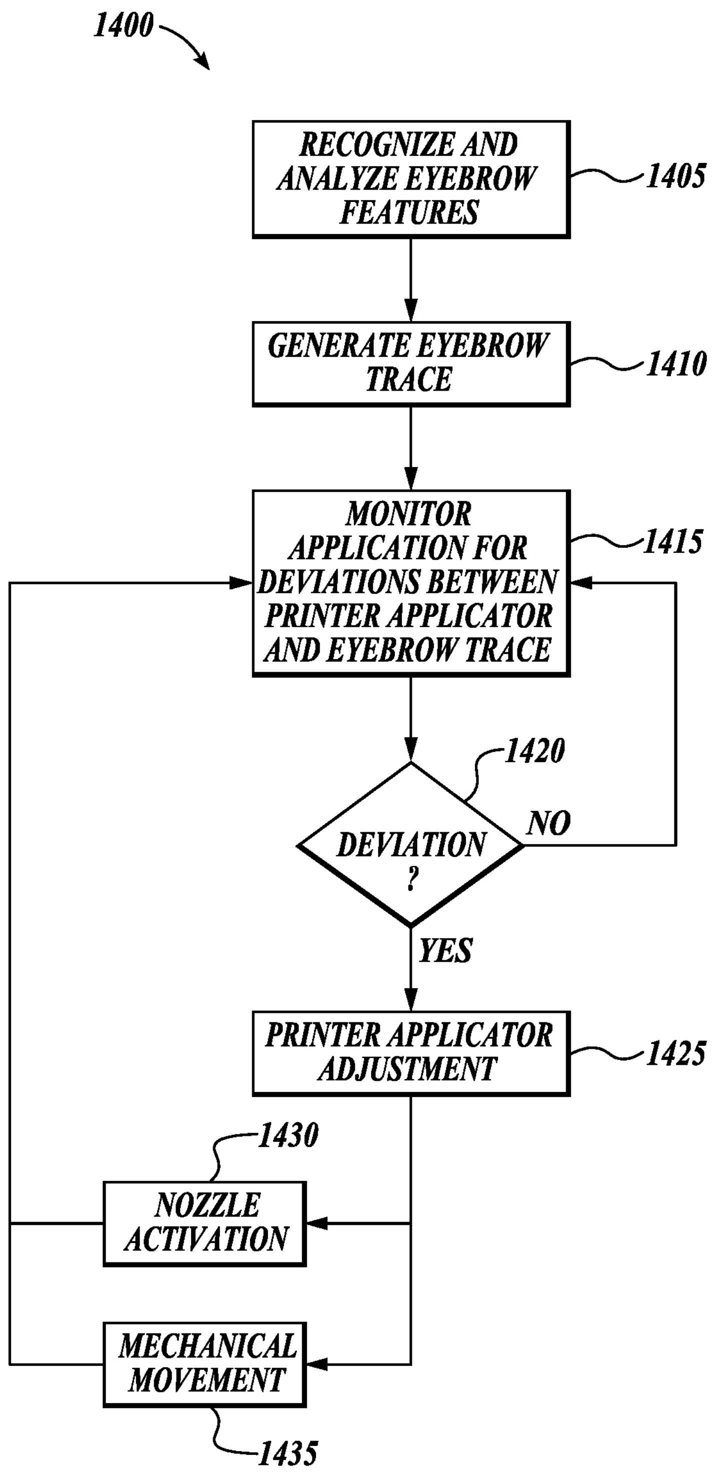
FIG. 14 shows a flowchart of an example printing operation with selective nozzle activation and/or selective mechanical movement for automatic correction of application of the composition in real time, according to the disclosure.

Accordingly, in a general aspect and as shown at FIG. 14, an example method 1400 for applying a cosmetic style with the cosmetic deposition device by a device and/or system of the disclosure is shown.

At block 1405, the cosmetic deposition device or system recognizes and analyzes eyebrow features. In embodiments, this occurs as a result of image analysis of an image of an eyebrow of the face of the subject.

At block 1410, the cosmetic deposition device or system generates an eyebrow trace, e.g., a trace of the eyebrow that is representative of a shape and size of the eyebrow. The eyebrow trace can optionally be stored in a non-transitory machine-readable medium of the device or system as a data structure.

At block 1415, during application of the cosmetic style to the skin, the cosmetic deposition device or system monitors the application of the cosmetic style for deviations of one or more applicator components from the intended trajectory of application. In embodiments, this monitoring occurs continuously during the application of the cosmetic style, for example, as part of a repeated logical loop.

At block 1420, if an actual or expected deviation from the intended trajectory is detected (block 1420: YES), the cosmetic deposition device or system makes the automatic correction, e.g., by activating and/or deactivating 1430 one or more nozzles of a plurality of applicator nozzles or by mechanical movement 1435 of an (active) movable applicator nozzle, and if no deviation from the intended trajectory is detected (block 1420: NO), the cosmetic deposition device or system continues to monitor the application for deviations at block 1415. Block 1420 can be considered as a subset of block 1415 and corresponds to a logical determination of whether the actual or expected deviation occurs.

The present disclosure may reference quantities and numbers. Unless specifically stated, such quantities and numbers are not to be considered restrictive, but representative of the possible quantities or numbers associated with the present disclosure. Also, in this regard, the present disclosure may use the term "plurality" to reference a quantity or number. In this regard, the term "plurality" is meant to be any number that is more than one, for example, two, three, four, five, etc. The terms "about," "approximately." "near," etc., mean plus or minus 5% of the stated value. For the purposes of the present disclosure, the phrase "at least one of A, B, and C." for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices or components such as a processor (e.g., a microprocessor), a central processing unit (CPU), a digital signal processor (DSP), an application-specific integrated circuit (ASIC), a field-programmable gate array (FPGA), or the like, or any combination thereof, and can include discrete digital or analog circuit elements or electronics, or combinations thereof.

An embodiment includes one or more data stores that, for example, stores instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a device and/or system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of example embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present disclosure may include references to directions, such as "vertical," "horizontal," "front." "rear." "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The principles, example embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

Non-Limiting Embodiments

While general features of the disclosure are described and shown and particular features of the disclosure are set forth in the claims, the following non-limiting embodiments relate to features, and combinations of features, that are explicitly envisioned as being part of the disclosure. The following non-limiting Embodiments contain elements that are modular and can be combined with each other in any number, order, or combination to form a new non-limiting Embodiment, which can itself be further combined with other non-limiting Embodiments.

Embodiment 1. A cosmetic deposition device for application of a cosmetic style to a portion of a biological surface of a subject, the cosmetic deposition device comprising: a cosmetic deposition assembly comprising an applicator component that is adjustable; a position sensor configured to detect a position of the applicator component relative to the portion of the biological surface; and circuitry operably connected to the cosmetic deposition assembly and the position sensor, wherein the circuitry is configured to: direct the cosmetic deposition assembly to dispense a cosmetic composition according to the cosmetic style as the applicator component traverses the portion of the biological surface; compute the position of the applicator component relative to the portion of the biological surface based on the position sensor; compute an adjustment of the applicator component based on the position of the applicator component relative to the portion of the biological surface; and direct the cosmetic deposition assembly to adjust the applicator component.

Embodiment 2. The cosmetic deposition device of Embodiment 1, wherein the circuitry operably connected to the cosmetic deposition assembly and the position sensor includes circuitry coupled to a piezo electric actuator configured to dispense the cosmetic composition responsive to an applied electrical charge sequence based on a cosmetic style protocol.

Embodiment 3. The cosmetic deposition device of any one of Embodiments 1-2, wherein the circuitry operably connected to the cosmetic deposition assembly and the position sensor includes circuitry that is configured to generate an instruction set based on one or more inputs associated with the cosmetic style that causes the applicator component to dispense the cosmetic composition according to a cosmetic style protocol.

Embodiment 4. The cosmetic deposition device of any one of Embodiments 1-3, wherein the position sensor comprises a camera, wherein the position of at least a portion of the cosmetic deposition device relative to the portion of the biological surface is computed by the circuitry of the cosmetic deposition device based at least in part on an image produced by the camera.

Embodiment 5. The cosmetic deposition device of any one of Embodiments 1-4, wherein the position sensor comprises a rolling position sensor configured to contact at or near the portion of the biological surface as the rolling position sensor rolls over the biological surface and to measure a curvature of the biological surface.

Embodiment 6. The cosmetic deposition device of any one of Embodiments 1-5, wherein the circuitry is further configured to: detect a deviation of the position of the applicator component from the portion of the biological surface; and direct the cosmetic deposition assembly to adjust the applicator component based on the deviation of the position of at least a portion of the cosmetic deposition device from the portion of the biological surface.

Embodiment 7. The cosmetic deposition device of any one of Embodiments 1-6, wherein the circuitry is further configured to: detect a deviation of the position of the applicator component from the portion of the biological surface; and direct the cosmetic deposition assembly to deactivate dispensing of the cosmetic composition from one or more nozzles of the applicator component based on the deviation of the position of at least a portion of the cosmetic deposition device from the portion of the biological surface.

Embodiment 8. The cosmetic deposition device of any one of Embodiments 1-7, wherein the applicator component comprises a plurality of applicator nozzles arranged in an array or grid configured for a vertical orientation during deposition of the cosmetic style to the portion of the biological surface, such that a vertical range for deposition of the cosmetic style is increased.

Embodiment 9. The cosmetic deposition device of any one of Embodiments 1-8, wherein the applicator component comprises a movable applicator nozzle that is slidably connected to the cosmetic deposition assembly for a vertical movement of the movable applicator nozzle during deposition of the cosmetic style to the portion of the biological surface, such that a vertical range for deposition of the cosmetic style is increased.

Embodiment 10. The cosmetic deposition device of any one of Embodiments 1-9, wherein the circuitry is further configured to: compute a trace of the portion of the biological surface of the subject based on an image of the portion of the biological surface, and optionally, compute a curvature of the trace of the portion of the biological surface; and compute the adjustment of the applicator component based on position sensor data in combination with the trace of the portion of the biological surface, and optionally, the curvature of the trace of the portion of the biological surface.

Embodiment 11. The cosmetic deposition device of any one of Embodiments 1-10, wherein the portion of the biological surface comprises a facial feature for receipt of the cosmetic style thereon.

Embodiment 12. The cosmetic deposition device of Embodiment 11, wherein the facial feature comprises an eyebrow or an eyelid.

Embodiment 13. The cosmetic deposition device of any one of Embodiments 1-12, wherein the applicator component is positioned at a first side of the cosmetic deposition device and a display is positioned at a second side of the cosmetic deposition device, wherein the first side is positioned opposite the second side on the cosmetic deposition device.

Embodiment 14. The cosmetic deposition device of Embodiment 13, wherein the display provides a user interface for control or use of the cosmetic deposition device.

Embodiment 15. A system for application of a cosmetic style to a portion of a biological surface of a subject, the system comprising: the cosmetic deposition device of any one of Embodiments 1-14; and a smart device comprising circuitry configured to: select the cosmetic style from a plurality of cosmetic styles; display the cosmetic style on an image of the portion of the biological surface of the subject; and transmit the cosmetic style as a makeup image file to the cosmetic deposition device; wherein the circuitry of the cosmetic deposition device is communicatively coupled to the circuitry of the smart device and is further configured to: receive the makeup image file from the smart device; and direct the cosmetic deposition assembly to dispense the cosmetic composition according to the cosmetic style as the applicator component traverses the portion of the biological surface based on the makeup image file.

Embodiment 16. The system of Embodiment 15, wherein the circuitry of the smart device comprises a processor and a non-transitory machine-readable medium storing processor-executable instructions which when executed by the processor configure the processor to select the cosmetic style from the plurality of cosmetic styles, display the cosmetic style on the image of the portion of the biological surface of the subject, and transmit the cosmetic style as the makeup image file to the cosmetic deposition device.

Embodiment 17. The system of any one of Embodiments 15-16, wherein the circuitry of the cosmetic deposition device comprises a processor and a non-transitory machine-readable medium storing processor-executable instructions which when executed by the processor configure the processor to receive the makeup image file from the smart device, and direct the cosmetic deposition assembly to print the cosmetic style with passage of the cosmetic composition from the reservoir through the applicator component to the portion of the biological surface based on the makeup image file.

Embodiment 18. A method of applying a cosmetic style with the cosmetic deposition device of any one of Embodiments 1-14, the method comprising: printing the cosmetic style onto the portion of the biological surface at a location adjacent to the applicator component; and automatically correcting the printing of the cosmetic style onto the portion of the biological surface based on: a position of at least a portion of the cosmetic deposition device relative to the portion of the biological surface, and optionally, a deviation of the portion of the cosmetic deposition device relative to the portion of the biological surface.

Embodiment 19. The method of Embodiment 18, wherein the automatically correcting the printing comprises selectively activating or deactivating one or more nozzles of a plurality of applicator nozzles of the applicator component, wherein the plurality of applicator nozzles is arranged in an array or grid configured for a vertical orientation during deposition of the cosmetic style to the portion of the biological surface, such that a vertical range for deposition of the cosmetic style is increased.

Embodiment 20. The method of Embodiment 18, wherein the automatically correcting the printing comprises selectively moving a movable applicator nozzle of the applicator component, wherein the movable applicator nozzle is slidably connected to the cosmetic deposition assembly for a vertical movement of the movable applicator nozzle during deposition of the cosmetic style to the portion of the biological surface, such that a vertical range for deposition of the cosmetic style is increased.

Embodiment 21. The method of any one of Embodiments 18-20, wherein the portion of the biological surface comprises a facial feature for receipt of the cosmetic style thereon.

Embodiment 22. The method of Embodiment 21, wherein the facial feature comprises an eyebrow or an eyelid.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A cosmetic deposition device for application of a cosmetic style to a portion of a biological surface of a subject, the cosmetic deposition device comprising:

a cosmetic deposition assembly comprising an applicator component that is adjustable;

a position sensor configured to detect a position of the applicator component relative to the portion of the biological surface; and circuitry operably connected to the cosmetic deposition assembly and the position sensor, wherein the circuitry is configured to:

direct the cosmetic deposition assembly to dispense a cosmetic composition according to the cosmetic style as the applicator component traverses the portion of the biological surface;

compute the position of the applicator component relative to the portion of the biological surface based on the position sensor;

detect a deviation of the position of the applicator component from the portion of the biological surface;

compute an adjustment of the applicator component based on the deviation of the position of the applicator component relative to the portion of the biological surface; and direct the cosmetic deposition assembly to adjust the applicator component.

2. The cosmetic deposition device of claim 1, wherein the circuitry operably connected to the cosmetic deposition assembly and the position sensor includes circuitry coupled to a piezo electric actuator configured to dispense the cosmetic composition responsive to an applied electrical charge sequence based on a cosmetic style protocol.

3. The cosmetic deposition device of claim 1, wherein the circuitry operably connected to the cosmetic deposition assembly and the position sensor includes circuitry that is configured to generate an instruction set based on one or more inputs associated with the cosmetic style that causes the applicator component to dispense the cosmetic composition according to a cosmetic style protocol.

4. The cosmetic deposition device of claim 1, wherein the position sensor comprises a camera, wherein the position of at least a portion of the cosmetic deposition device relative to the portion of the biological surface is computed by the circuitry of the cosmetic deposition device based at least in part on an image produced by the camera.

5. The cosmetic deposition device of claim 1, wherein the position sensor comprises a rolling sensor configured to contact at or near the portion of the biological surface as the rolling position sensor rolls over the biological surface and to measure a curvature of the biological surface.

6. The cosmetic deposition device of claim 1, wherein the applicator component comprises a plurality of applicator nozzles arranged in an array or grid configured for a vertical orientation during deposition of the cosmetic style to the portion of the biological surface, such that a vertical range for deposition of the cosmetic style is increased.

7. The cosmetic deposition device of claim 1, wherein the applicator component comprises a movable applicator nozzle that is slidably connected to the cosmetic deposition assembly for a vertical movement of the movable applicator nozzle during deposition of the cosmetic style to the portion of the biological surface, such that a vertical range for deposition of the cosmetic style is increased.

8. The cosmetic deposition device of claim 1, wherein the circuitry is further configured to:

compute a trace of the portion of the biological surface of the subject based on an image of the portion of the biological surface, and optionally, compute a curvature of the trace of the portion of the biological surface; and compute the adjustment of the applicator component based on position sensor data in combination with the trace of the portion of the biological surface, and optionally, the curvature of the trace of the portion of the biological surface.

9. The cosmetic deposition device of claim 1, wherein the portion of the biological surface comprises a facial feature for receipt of the cosmetic style thereon.

10. The cosmetic deposition device of claim 9, wherein the facial feature comprises an eyebrow or an eyelid.

11. The cosmetic deposition device of claim 1, wherein the applicator component is positioned at a first side of the cosmetic deposition device and a display is positioned at a second side of the cosmetic deposition device, wherein the first side is positioned opposite the second side on the cosmetic deposition device.

12. The cosmetic deposition device of claim 11, wherein the display provides a user interface for control or use of the cosmetic deposition device.

13. A system for application of a cosmetic style to a portion of a biological surface of a subject, the system comprising:

the cosmetic deposition device of claim 1; and a smart device comprising circuitry configured to:

select the cosmetic style from a plurality of cosmetic styles;

display the cosmetic style on an image of the portion of the biological surface of the subject; and transmit the cosmetic style as a makeup image file to the cosmetic deposition device;

wherein the circuitry of the cosmetic deposition device is communicatively coupled to the circuitry of the smart device and is further configured to:

receive the makeup image file from the smart device; and direct the cosmetic deposition assembly to dispense the cosmetic composition according to the cosmetic style as the applicator component traverses the portion of the biological surface based on the makeup image file.

14. The system of claim 13, wherein the circuitry of the smart device comprises a processor and a non-transitory machine-readable medium storing processor-executable instructions which when executed by the processor configure the processor to select the cosmetic style from the plurality of cosmetic styles, display the cosmetic style on the image of the portion of the biological surface of the subject, and transmit the cosmetic style as the makeup image file to the cosmetic deposition device.

15. The system of claim 13, wherein the circuitry of the cosmetic deposition device comprises a processor and a non-transitory machine-readable medium storing processor-executable instructions which when executed by the processor configure the processor to receive the makeup image file from the smart device, and direct the cosmetic deposition assembly to print the cosmetic style with passage of the cosmetic composition from the reservoir through the applicator component to the portion of the biological surface based on the makeup image file.

16. A method of applying a cosmetic style with the cosmetic deposition device of claim 1, the method comprising:

printing the cosmetic style onto the portion of the biological surface at a location adjacent to the applicator component; and automatically correcting the printing of the cosmetic style onto the portion of the biological surface based on:

a position of at least a portion of the cosmetic deposition device relative to the portion of the biological surface, and optionally, a deviation of the portion of the cosmetic deposition device relative to the portion of the biological surface.

17. The method of claim 16, wherein the automatically correcting the printing comprises selectively activating or deactivating one or more nozzles of a plurality of applicator nozzles of the applicator component, wherein the plurality of applicator nozzles is arranged in an array or grid configured for a vertical orientation during deposition of the cosmetic style to the portion of the biological surface, such that a vertical range for deposition of the cosmetic style is increased.

18. The method of claim 16, wherein the automatically correcting the printing comprises selectively moving a movable applicator nozzle of the applicator component, wherein the movable applicator nozzle is slidably connected to the cosmetic deposition assembly for a vertical movement of the movable applicator nozzle during deposition of the cosmetic style to the portion of the biological surface, such that a vertical range for deposition of the cosmetic style is increased.

19. The method of claim 16, wherein the portion of the biological surface comprises a facial feature for receipt of the cosmetic style thereon.

20. The method of claim 19, wherein the facial feature comprises an eyebrow or an eyelid.

21. The cosmetic deposition device of claim 1, wherein adjusting the applicator component based on the deviation of the position of the applicator component relative to the portion of the biological surface comprises:

selectively moving a movable applicator nozzle of the applicator component, wherein the movable applicator nozzle is slidably connected to the cosmetic deposition assembly for a vertical movement of the movable applicator nozzle during deposition of the cosmetic style to the portion of the biological surface, such that a vertical range for deposition of the cosmetic style is increased.

22. A cosmetic deposition device for application of a cosmetic style to a portion of a biological surface of a subject, the cosmetic deposition device comprising:

a cosmetic deposition assembly comprising an applicator component that is adjustable;

a position sensor configured to detect a position of the applicator component relative to the portion of the biological surface; and circuitry operably connected to the cosmetic deposition assembly and the position sensor, wherein the circuitry is configured to:

direct the cosmetic deposition assembly to dispense a cosmetic composition according to the cosmetic style as the applicator component traverses the portion of the biological surface;

compute the position of the applicator component relative to the portion of the biological surface based on the position sensor;

detect a deviation of the position of the applicator component from the portion of the biological surface;

compute an adjustment of the applicator component based on the deviation of the position of the applicator component relative to the portion of the biological surface; and direct the cosmetic deposition assembly to deactivate dispensing of the cosmetic composition from one or more nozzles of the applicator component based on the deviation of the position of the cosmetic deposition device from the portion of the biological surface.

* * * * *